(12) United States Patent
Kim et al.

(10) Patent No.: US 11,664,685 B2
(45) Date of Patent: May 30, 2023

(54) LEVITATING DISPLAY DEVICE

(71) Applicant: SAMSUNG ELECTRONICS CO., LTD., Suwon-si (KR)

(72) Inventors: Moonyoung Kim, Suwon-si (KR); Jeongil Kang, Suwon-si (KR); Jaesung Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 133 days.

(21) Appl. No.: 17/114,801

(22) Filed: Dec. 8, 2020

(65) Prior Publication Data

US 2021/0175754 A1    Jun. 10, 2021

(30) Foreign Application Priority Data

Dec. 10, 2019 (KR) .................. 10-2019-0163974

(51) Int. Cl.
*H02J 50/00* (2016.01)
*H02J 50/40* (2016.01)
(Continued)

(52) U.S. Cl.
CPC .............. *H02J 50/402* (2020.01); *G06F 3/14* (2013.01); *H02J 50/00* (2016.02); *H02J 50/10* (2016.02); *H02J 50/12* (2016.02); *H02J 50/40* (2016.02); *H04N 5/38* (2013.01); *H04N 5/44* (2013.01); *H04N 5/63* (2013.01); *H04N 5/655* (2013.01); *F16M 11/22* (2013.01); *F16M 13/02* (2013.01)

(58) Field of Classification Search
None
See application file for complete search history.

(56) References Cited

U.S. PATENT DOCUMENTS 8,167,253 B2 * 5/2012 Smith .................... A47B 81/06
                                                   108/93
8,901,880 B2 * 12/2014 Cook .................... H01Q 7/005
                                                   455/418
(Continued)

FOREIGN PATENT DOCUMENTS

KR    10-2015-0090668 A    8/2015
KR    10-2017-0106083 A    9/2017
(Continued)

OTHER PUBLICATIONS

"VESA wall mounts: The clever way to mount flat screen TVs—and speakers", website available at https://blog.teufelaudio.com/vesa-mounts/ Google search reveals it as publishes Jan. 27, 2017 (Year: 2017).*

(Continued)

*Primary Examiner* — Adi Amrany
(74) *Attorney, Agent, or Firm* — Sughrue Mion, PLLC

(57) ABSTRACT

Provided are a levitating display device and an operating method thereof. The display device includes a frame unit and a panel unit, wherein the frame unit includes a power receiver and a wireless power transmitter configured to wirelessly transmit power received by the power receiver to the panel unit, and the panel unit includes a wireless power receiver configured to wirelessly receive the power from the wireless power transmitter and a display configured to receive the power from the wireless power receiver and display an image.

19 Claims, 32 Drawing Sheets

(51) Int. Cl.
*H02J 50/12* (2016.01)
*G06F 3/14* (2006.01)
*H04N 5/38* (2006.01)
*H04N 5/44* (2011.01)
*H04N 5/63* (2006.01)
*H04N 5/655* (2006.01)
*H02J 50/10* (2016.01)
*F16M 11/22* (2006.01)
*F16M 13/02* (2006.01)

(56) References Cited

U.S. PATENT DOCUMENTS

| | | | |
|---|---|---|---|
| 9,831,718 B2 | 11/2017 | Leabman et al. | |
| 9,843,763 B2 | 12/2017 | Leabman et al. | |
| 10,140,949 B2 | 11/2018 | Seo | |
| 10,205,350 B2* | 2/2019 | Clark | H02J 50/80 |
| 10,714,978 B2 | 7/2020 | Choi et al. | |
| 2007/0202931 A1* | 8/2007 | Lee | H04B 3/58 |
| | | | 340/538.17 |
| 2009/0096413 A1* | 4/2009 | Partovi | H01F 27/2804 |
| | | | 320/108 |
| 2011/0133569 A1* | 6/2011 | Cheon | H02J 50/50 |
| | | | 307/104 |
| 2011/0175456 A1* | 7/2011 | Kozakai | H02J 50/12 |
| | | | 307/104 |
| 2012/0134519 A1* | 5/2012 | Caldes | H04R 1/2811 |
| | | | 381/306 |
| 2013/0230200 A1* | 9/2013 | Lau | H04R 1/02 |
| | | | 381/332 |
| 2014/0192486 A1 | 7/2014 | Kuramitsu et al. | |
| 2014/0361633 A1 | 12/2014 | Abe | |
| 2015/0049252 A1* | 2/2015 | Matsuhisa | H02J 50/10 |
| | | | 348/730 |
| 2016/0218521 A1* | 7/2016 | Huang | H02J 50/10 |
| 2017/0192486 A1 | 7/2017 | Park et al. | |
| 2018/0101090 A1* | 4/2018 | Lablans | H04N 5/2624 |
| 2018/0159371 A1* | 6/2018 | Kim | H02J 50/80 |
| 2018/0301940 A1 | 10/2018 | Yeo et al. | |
| 2019/0229556 A1* | 7/2019 | Choi | H04B 5/0037 |
| 2019/0245386 A1* | 8/2019 | Jung | H02M 7/53871 |
| 2020/0227950 A1* | 7/2020 | Lim | G06F 1/263 |
| 2020/0412176 A1 | 12/2020 | Choi | |
| 2021/0013744 A1* | 1/2021 | Choi | H02J 7/00034 |

FOREIGN PATENT DOCUMENTS

| | | |
|---|---|---|
| KR | 10-2018-0005319 A | 1/2018 |
| KR | 10-2018-0059223 A | 6/2018 |
| KR | 10-2018-0122208 A | 11/2018 |
| WO | 2019/203445 A1 | 10/2019 |

OTHER PUBLICATIONS

International Search Report (PCT/ISA/210) and Written Opinion (PCT/ISA/237)issued by the International Searching Authority in International Application No. PCT/KR2020/017960, dated Mar. 15, 2021.

Communication dated Apr. 14, 2021, from the European Patent Office in European Application No. 20212887.2.

Communication dated Jan. 19, 2023 issued by the European Patent Office in application No. 20212887.2.

* cited by examiner

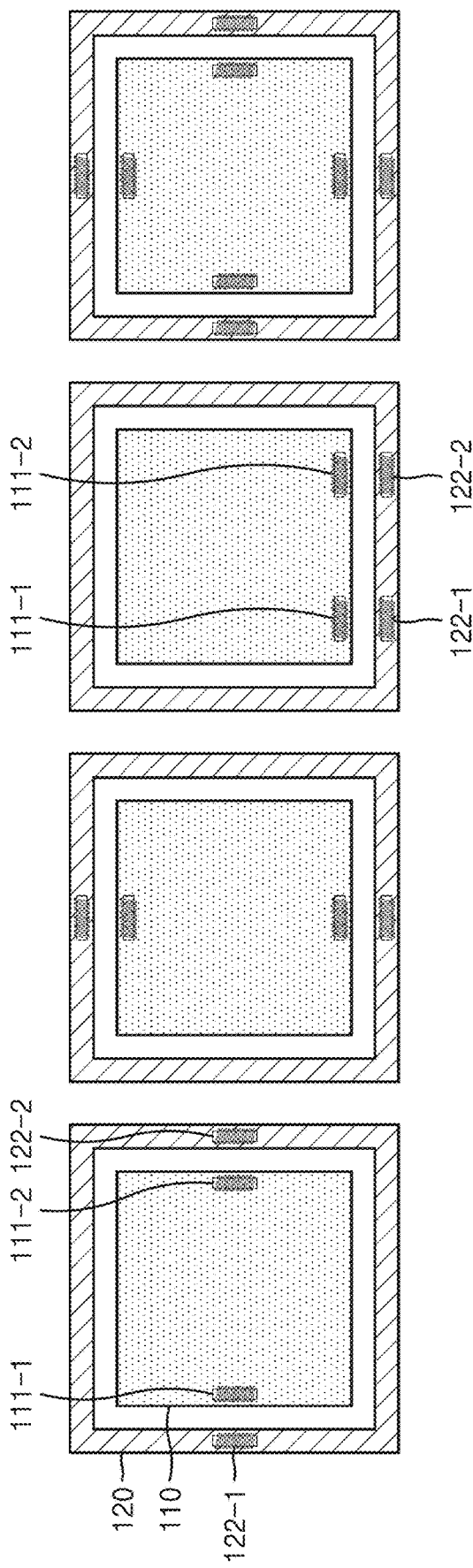

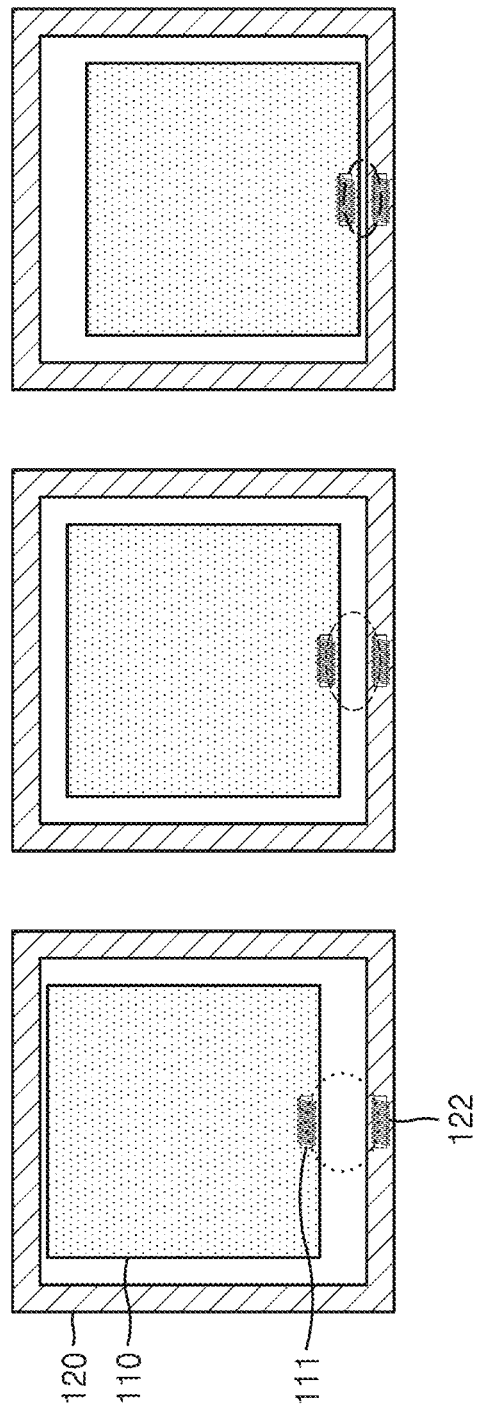

LEVITATING DISPLAY DEVICE

CROSS-REFERENCE TO RELATED APPLICATION

This application is based on and claims priority under 35 U.S.C. § 119 to Korean Patent Application No. 10-2019-0163974, filed on Dec. 10, 2019, in the Korean Intellectual Property Office, the disclosure of which is incorporated by reference herein in its entirety.

BACKGROUND

1. Field

The disclosure relates to a display device that appears to be floating in the air and an operating method thereof.

2. Description of Related Art

Today, when selecting electronic products, consumers do not only consider the functionality and practicality of the products, but also tend to select or purchase products that may blend in with their lives and aesthetically fill the users' spaces. With the rise of Artygen (Arty Generation), which is a consumer group that values designs combined with product functions, companies are adopting a Techart Marketing strategy that involves combining technology with art and are releasing products in which artistic designs are combined with culture. For example, a TV that appears like a picture frame, displayed in an art museum, has been released and spotlighted.

SUMMARY

Provided are a display device that appears to be floating in space and an operating method thereof.

Additional aspects will be set forth in part in the description which follows and, in part, will be apparent from the description, or may be learned by practice of the presented embodiments.

According to an embodiment, there is provided a display device including: a panel unit; and a frame unit configured to enclose the panel unit. The frame unit includes: a power receiver, and a wireless power transmitter configured to wirelessly transmit power received by the power receiver to the panel unit. The panel unit includes: a wireless power receiver configured to wirelessly receive the power from the wireless power transmitter, and a display configured to receive the power from the wireless power receiver and display an image.

The display device further includes a transparent support to which the frame unit and the panel unit that are spaced apart from each other are fixed.

The display device further includes a transparent support to which the frame unit and the panel unit that are spaced apart from each other are fixed so that the frame unit encloses the panel unit from a front view.

The wireless power receiver includes a bar-shaped receiving resonator located on an edge of a side of the panel unit and extending in a rim direction of the panel unit, and the wireless power transmitter includes a bar-shaped transmitting resonator configured to wirelessly transmit the power to the bar-shaped receiving resonator based on the bar-shaped transmitting resonator and the bar-shaped receiving resonator being located side by side.

The display device further includes a transparent support to which the frame unit and the panel unit that are spaced apart from each other are fixed, so that the bar-shaped transmitting resonator and the bar-shaped receiving resonator are located side by side.

A first length of the bar-shaped transmitting resonator is different from a second length of the bar-shaped receiving resonator.

The wireless power receiver includes: a first power receiver located on an edge of a first side of the panel unit, and a second power receiver located on an edge of a second side opposite to the first side of the panel unit, and the wireless power transmitter includes: a first power transmitter configured to wirelessly transmit a first power to the first power receiver, and a second power transmitter configured to wirelessly transmit a second power to the second power receiver.

The display device further includes a transparent support to which the frame unit and the panel unit that are spaced apart from each other are fixed, so that the first power transmitter is located outside the first power receiver and the second power transmitter is located outside the second power receiver.

The first power receiver and the second power receiver are electrically connected in series to each other.

The wireless power receiver is configured to increase an output voltage of the second power receiver based on an output voltage of the first power receiver decreasing.

The first power transmitter and the second power transmitter generate magnetic fluxes in opposite directions.

The wireless power transmitter includes: a first power transmitter located on a first side of the frame unit, and a second power transmitter located on a second side of the frame unit, wherein the first power transmitter and the second power transmitter generate magnetic fluxes in opposite directions.

The frame unit further includes: an image receiver, and a short-range wireless transmitter configured to transmit an image signal received by the image receiver through short-range wireless communication, and wherein the panel unit further includes a short-range wireless receiver configured to receive the image signal through the short-range wireless communication from the short-range wireless transmitter based on the panel unit and the frame unit being spaced apart from each other.

The panel unit further includes a wired power receiver configured to receive the power by wire and supply the power to the display, and wherein the display is further configured to selectively receive the power from at least one from among the wireless power receiver and the wired power receiver.

The frame unit further includes an auxiliary functional unit configured to operate independently from the panel unit, wherein the wireless power transmitter is further configured to: determine whether the panel unit is located at a distance in which wireless power transmission is possible, and turn on or off the wireless power transmitter according to a result of the determining.

The panel unit further includes screw holes according to a VESA mounting interface standard to fix the panel unit to a wall-mount, and wherein the frame unit further includes a coupling portion for fixing the frame unit to the wall-mount.

The panel unit further includes screw holes according to a VESA mounting interface standard, the transparent support includes holes according to the VESA mounting interface standard, and the display device further includes an extension screw, wherein the extension screw includes: a front header for coupling the panel unit and the transparent support together according to the VESA mounting interface standard, and a rear header for fixing the transparent support to a wall-mount.

According to an embodiment, there is provided an operating method of a display device including a panel unit and a frame unit configured to enclose the panel unit. The operating method includes: receiving, by the frame unit, power from the outside; wirelessly transmitting, by the frame unit, the power to the panel unit; wirelessly receiving, by the panel unit, the power from the frame unit; and displaying, by the panel unit, an image.

The operating method further includes: determining, by the frame unit, whether the panel unit is located at a distance in which wireless power transmission is possible; and turning on or off, by the frame unit, the wireless power transmission according to a result of the determining.

According to an embodiment, there is provided a non-transitory computer-readable recording medium having stored thereon a program for executing the operating method described above.

BRIEF DESCRIPTION OF THE DRAWINGS

The above and other aspects, features, and advantages of certain embodiments of the disclosure will become more apparent from the following description taken in conjunction with the accompanying drawings, in which:

FIGS. 20A-20D are views illustrating various arrangements of a wireless power transmitter and a wireless power receiver according to an embodiment;

FIGS. 21A-21C are views illustrating various alignment relationships between a frame unit and a panel unit of a display device according to an embodiment;

DETAILED DESCRIPTION

Figure 1:
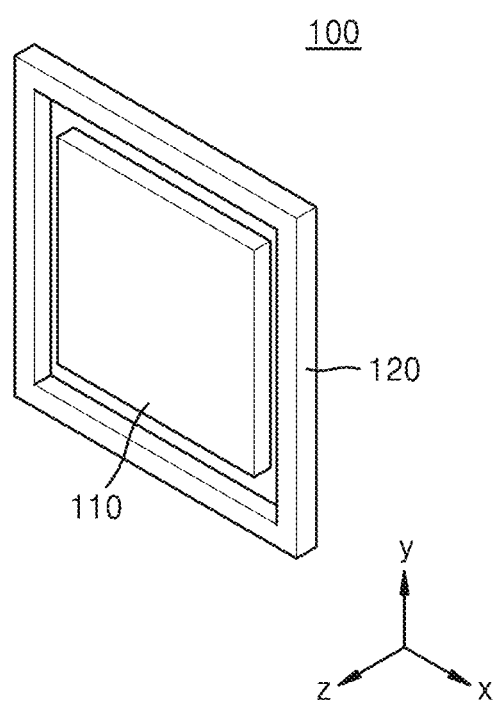
FIG. 1 is a view of a display device according to an embodiment.

The disclosure will now be described more detail with reference to the accompanying drawings, in which embodiments of the disclosure are shown. In the description, certain detailed explanations of related or well-known functions or elements are omitted when it is deemed that they may unnecessarily obscure the essence of the disclosure. In the drawings, elements having substantially the same functions are denoted by the same reference numerals or symbols. An apparatus and a method thereof will be described together when necessary for convenience of explanation. Throughout the disclosure, when a component is referred to as being "connected" to another component, it will be understood that the component is "directly connected" to the other component or is "electrically connected" to the other component with another component therebetween.

Throughout the disclosure, the expression "at least one of a, b or c" may include only a, only b, only c, both a and b, both a and c, both b and c, all of a, b, and c, or any combinations thereof.

FIG. 1 is a view of a display device according to an embodiment. Referring to FIG. 1, a display device 100 according to an embodiment of the disclosure includes a panel unit 110 and a frame unit 120. The panel unit 110 is a portion on which an image is displayed, and the frame unit 120 is a portion located around the panel unit 110 and configured to make the panel unit 110 look as if the panel unit 110 is inside a picture frame. Because the panel unit 110 and the frame unit 120 are spaced apart from each other without contacting each other as shown in FIG. 1, the panel unit 110 looks as if it is floating in the air.

Along the z-axis perpendicular to a surface of the panel unit 110 on which an image is displayed, a side where the panel unit 110 displays the image is referred to as a front side and the opposite side is referred to as a rear side. A direction of an xy plane parallel to the surface of the panel unit 110 on which the image is displayed is referred to as a lateral direction. On the xy plane, a direction toward the center of the panel unit 110 is referred to as an inner direction and the opposite direction is referred to as an outer direction.

The frame unit 120 may be located outside the panel unit 110 and may surround the panel unit 110. The frame unit 120 may have a closed curve shape as shown in FIG. 1, and may completely surround the panel unit 110. In this case, the frame unit 120 is described as enclosing the panel unit 110. The frame unit 120 and the panel unit 110 may be located on the same plane. The frame unit 120 may be located slightly in front of or behind the panel unit 110. The panel unit 110 may have a flat shape, and the frame unit 120 may have a closed or open bar shape. Each of the panel unit 110 and the frame unit 120 may have a quadrangular shape. However, one or more embodiments are not limited thereto, and the panel unit 110 and the frame unit 120 may be in the form of any other shapes. The panel unit 110 and the frame unit 120 may be arranged to appear to be spaced apart from each other when viewed from the front.

Figure 2:
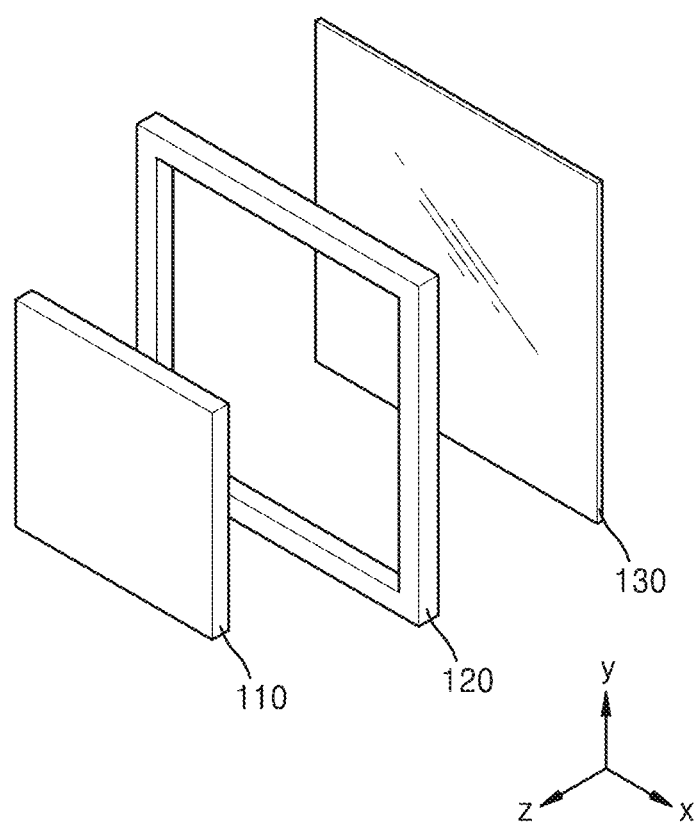
FIG. 2 is an exploded view of a display device according to an embodiment.

FIG. 2 is an exploded view of a display device according to an embodiment. Referring to FIG. 2, the display device 100 according to an embodiment of the disclosure may include the panel unit 110, the frame unit 120 and a transparent support 130. The transparent support 130 fixes the panel unit 110 and the frame unit 120 at separated positions, and makes the panel unit 110 look as if the panel unit 110 is floating in the air without being connected to the frame unit 120. That is, the panel unit 110 and the frame unit 120 may be spaced apart from each other and may be fixed to the transparent support 130. The transparent support 130 may include a frame fixing portion and a panel fixing portion. When the frame unit 120 is fixed to the frame fixing portion and the panel unit 110 is fixed to the panel fixing portion, the frame unit 120 and the panel unit 110 may be spaced apart from each other without contacting each other. A method of fixing the panel unit 110 and the frame unit 120 to the transparent support 130 will be described below with reference to FIG. 8. The display device 100 may not include the transparent support 130, and in this case, a method of fixing the panel unit 110 and the frame unit 120 at separated positions will be described below with reference to FIG. 15.

FIGS. 3 through 7 are views illustrating display devices having various shapes according to embodiments.

Figure 3:
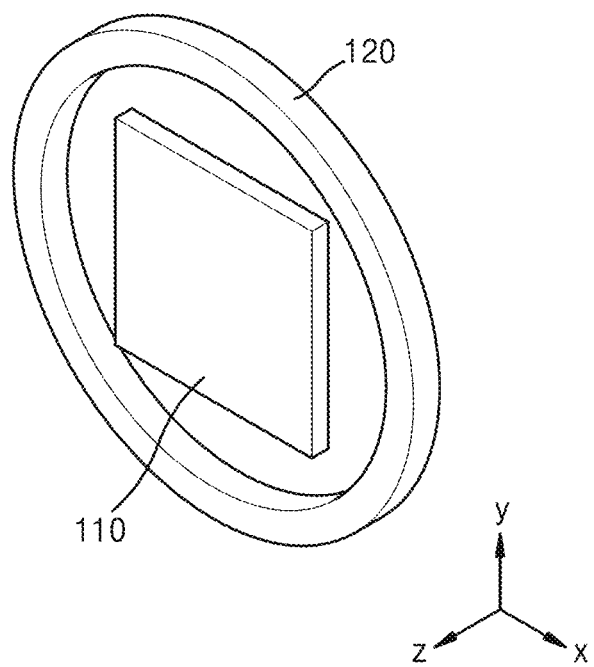
FIGS. 3 through 7 are views illustrating display devices having various shapes according to embodiments.
Figure 4:
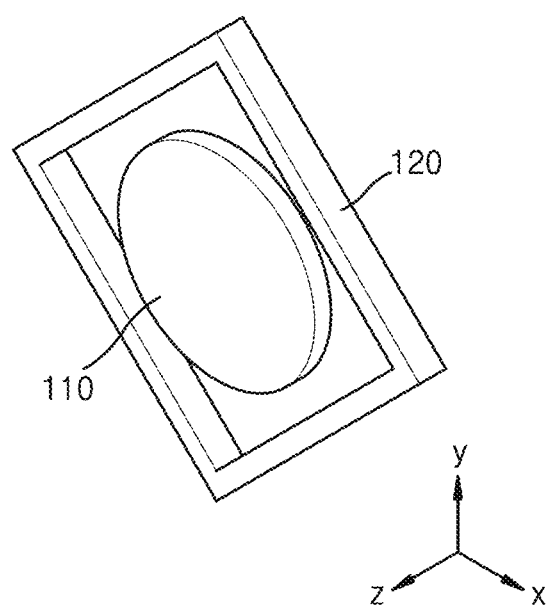
Figure 5:
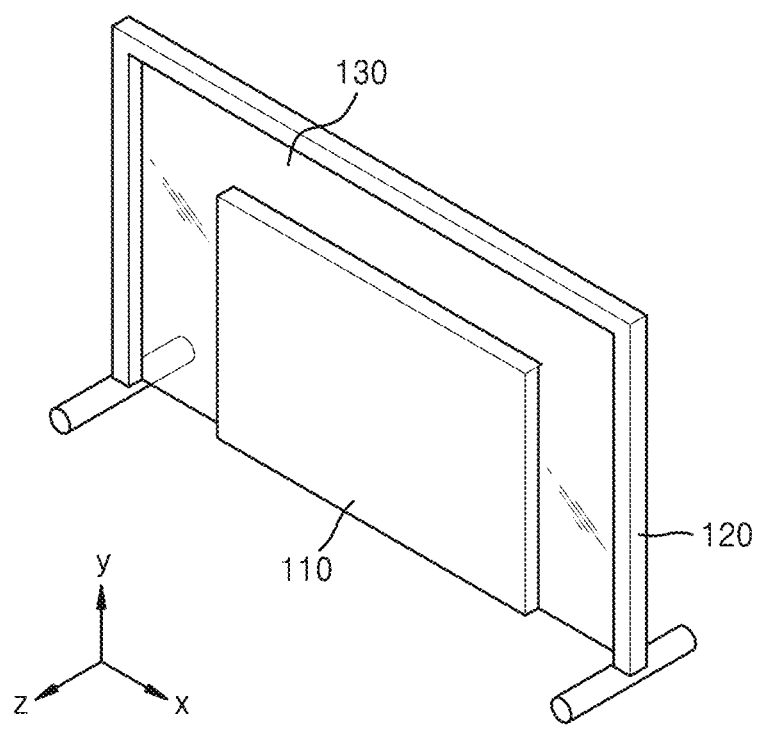
Figure 6:
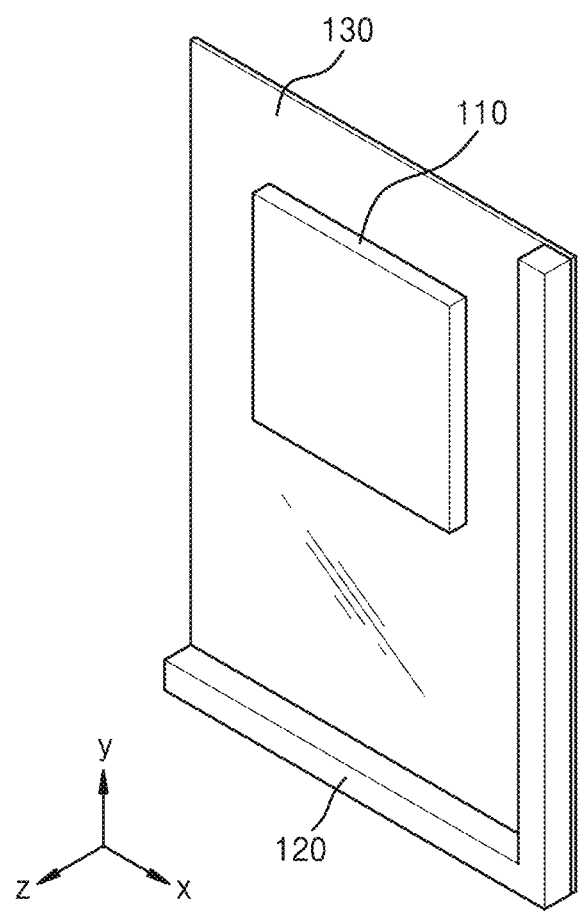
Figure 7:
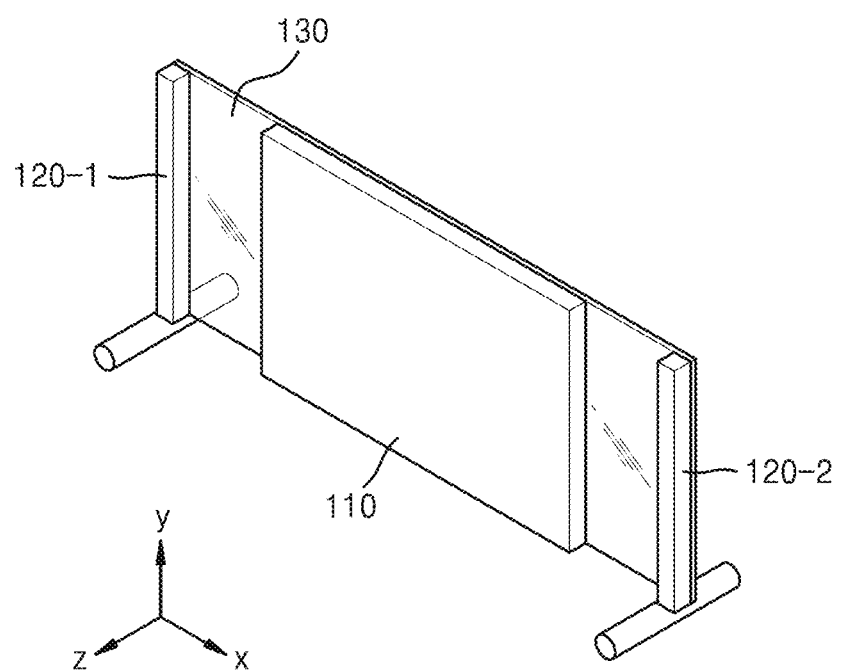

Referring to FIG. 3, the frame unit 120 may have a circular shape, instead of a quadrangular shape. However, the frame unit 120 may have any other shapes. Referring to FIG. 4, the panel unit 110 may have a circular shape, instead of a quadrangular shape. The panel unit 110 may have any other shapes. Both the panel unit 110 and the frame unit 120 may not have quadrangular shapes. For example, both the panel unit 110 and the frame unit 120 may have circular shapes. Referring to FIGS. 5 and 6, the frame unit 120 may not have a closed curve shape, and may surround only a part of the panel unit 110. Here, the frame unit 120 may surround only three sides of the panel unit 110. Referring to FIG. 7, the frame unit 120 may include a plurality of portions 120-1 and 120-2 that are separated from one another. Here, the panel unit 110 may be disposed between a first portion 120-1 and a second portion 120-2 among the plurality of portions 120.

Figure 8:
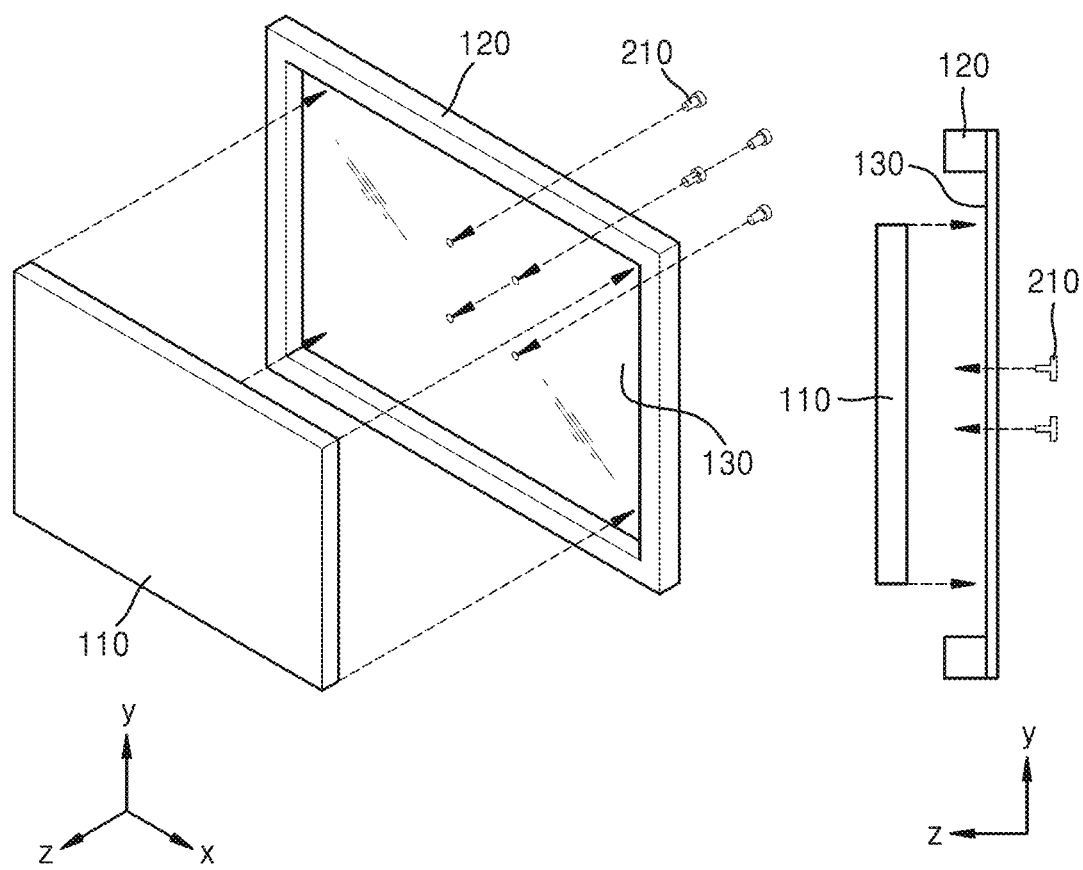
FIG. 8 is a view illustrating a method of fixing a panel unit and a frame unit to a transparent support according to an embodiment.

FIG. 8 is a view illustrating a method of fixing a panel unit and a frame unit to a transparent support according to an embodiment. The panel unit 110 and the frame unit 120 may be fixed to a front surface of the transparent support 130. That is, the transparent support 130 may be fixed to rear surfaces of the panel unit 110 and the frame unit 120.

As described above, the frame unit 120 may enclose the panel unit 110. In this case, when viewed from the front, the frame unit 120 may be fixed to the transparent support 130 to enclose the panel unit 110.

The panel unit 110 may have a Video Electronics Standards Association (VESA) standard mounting interface to be compatible with various display mounts. Accordingly, the transparent support 130 may also have a VESA standard mounting interface, and the panel unit 110 and the transparent support 130 may be fixed by using one or more screws 210 according to the VESA standard. The panel unit 110 and the transparent support 130 may be fixed by using other fixing methods. The panel unit 110 and the transparent support 130 may be detachably manufactured, or may be integrally manufactured.

The frame unit 120 and the transparent support 130 may also be fixed by using various fixing methods. The frame unit 120 and the transparent support 130 may also be detachably manufactured, or may be integrally manufactured.

The transparent support 130 may be entirely transparent or partially transparent. That is, the transparent support 130 may include a transparent portion and an opaque portion. A portion of the transparent support 130 that connects the panel unit 110 and the frame unit 120 may not be opaque. When the transparent support 130 is fixed to the rear surfaces of the panel unit 110 and the frame unit 120, a portion of the transparent support 130 that is visible when viewed from the front may be transparent.

The transparent support 130 or the transparent portion of the transparent support 130 may be formed of a transparent material. The transparent material may have a strength high enough to withstand a weight of the panel unit 110 and/or the frame unit 120, and may include, for example, glass or acryl. The frame unit 120 and the transparent support 130 may be integrally manufactured by using a transparent material, or only the frame unit 120 may be coated.

When an element is transparent, it means that incident visible light is entirely or partially transmitted through the element. A visible light transmittance of the transparent portion of the transparent support 130 may be, for example, 10%, 60%, or 90%. The effect that the panel unit 110 looks as if it is floating in the air increases as a visible light transmittance of the transparent support 130 increases. However, when a visible light transmittance is low, but an object behind the transparent support 130 is visible through the transparent support 130, the panel unit 110 may look as if it is floating in the air. The transparent support 130 may be colorless in order to improve levitation effect, or may have a specific color in order to enhance aesthetics.

The panel unit 110, the frame unit 120, and the transparent support 130 may be fixed in different forms. For example, the panel unit 110 may be fixed to the front surface of the transparent support 130, and the frame unit 120 may be fixed to an outer surface of the transparent support 130. Alternatively, the transparent support 130 may have a donut shape in which the center is empty, and the panel unit 110 and the frame unit 120 may be respectively fixed to an inner side and the outer side of the transparent support 130. Regardless of how the panel unit 110, the frame unit 120, and the transparent support 130 are fixed, a portion of the transparent support 130 that is visible when viewed from the front may be configured to be transparent.

When the frame unit 120 and the panel unit 110 are fixed to the transparent support 130 so that the frame unit 120 encloses the panel unit 110 when viewed from the front, an entire space between the frame unit 120 and the panel unit 110 when viewed from the front may be transparent. That is, the transparent support 130 may include the transparent portion that occupies the entire space between the frame unit 120 and the panel unit 110 when viewed from the front.

Figure 9:
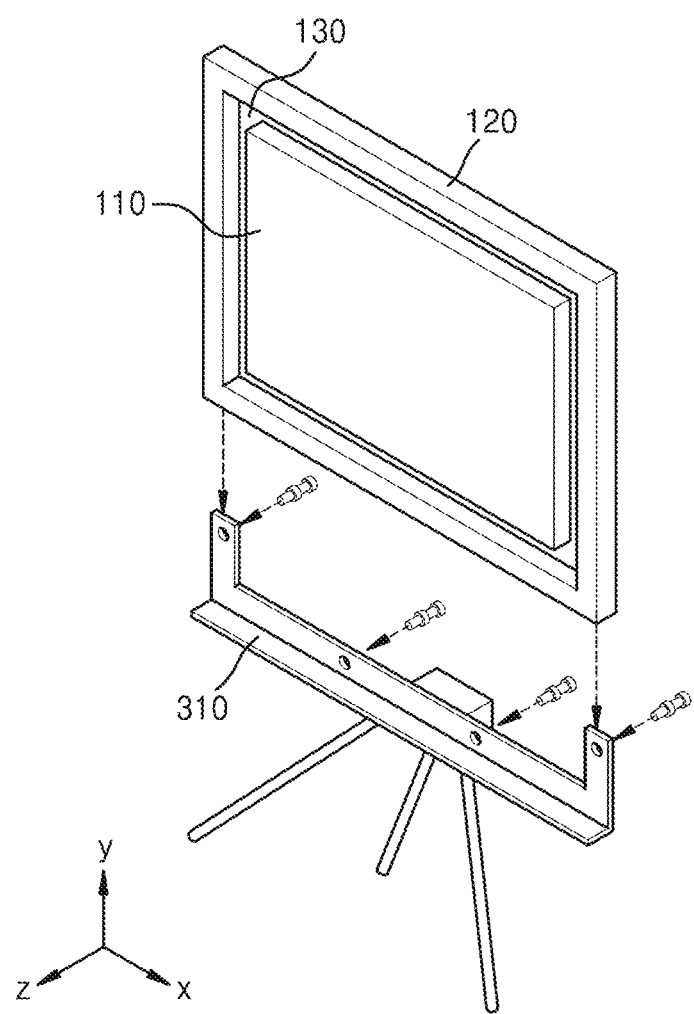
FIG. 9 is a view illustrating a method of connecting a stand to a display device, according to an embodiment.
Figure 10:
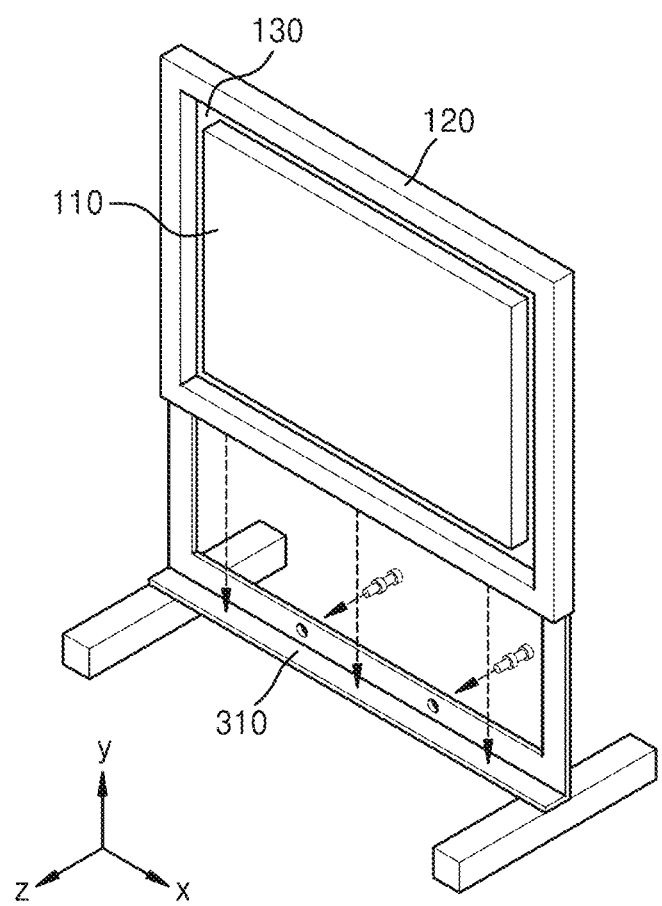
FIG. 10 is a view illustrating a method of connecting a stand to a display device according to an embodiment.
Figure 11:
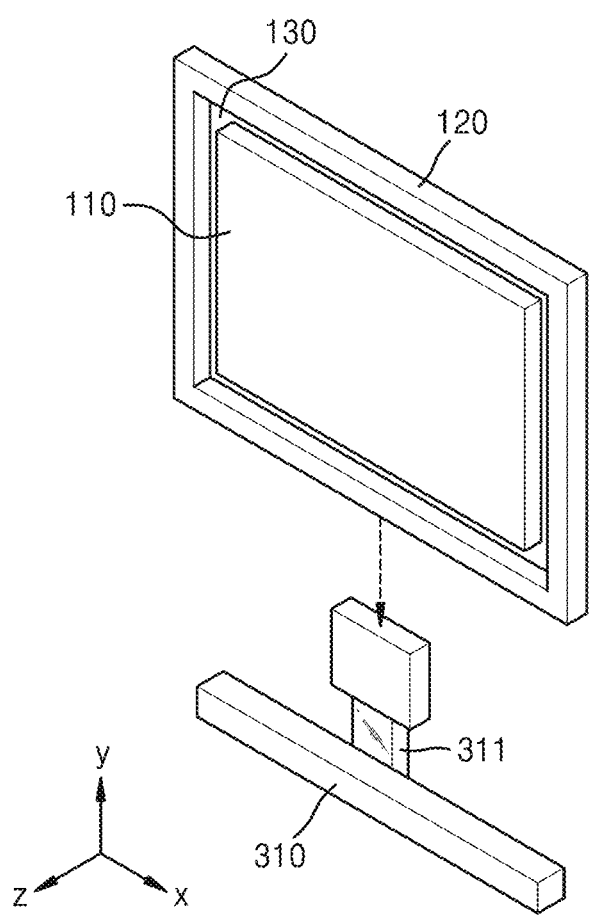
FIG. 11 is a view illustrating a method of connecting a stand to a display device according to an embodiment.
Figure 12:
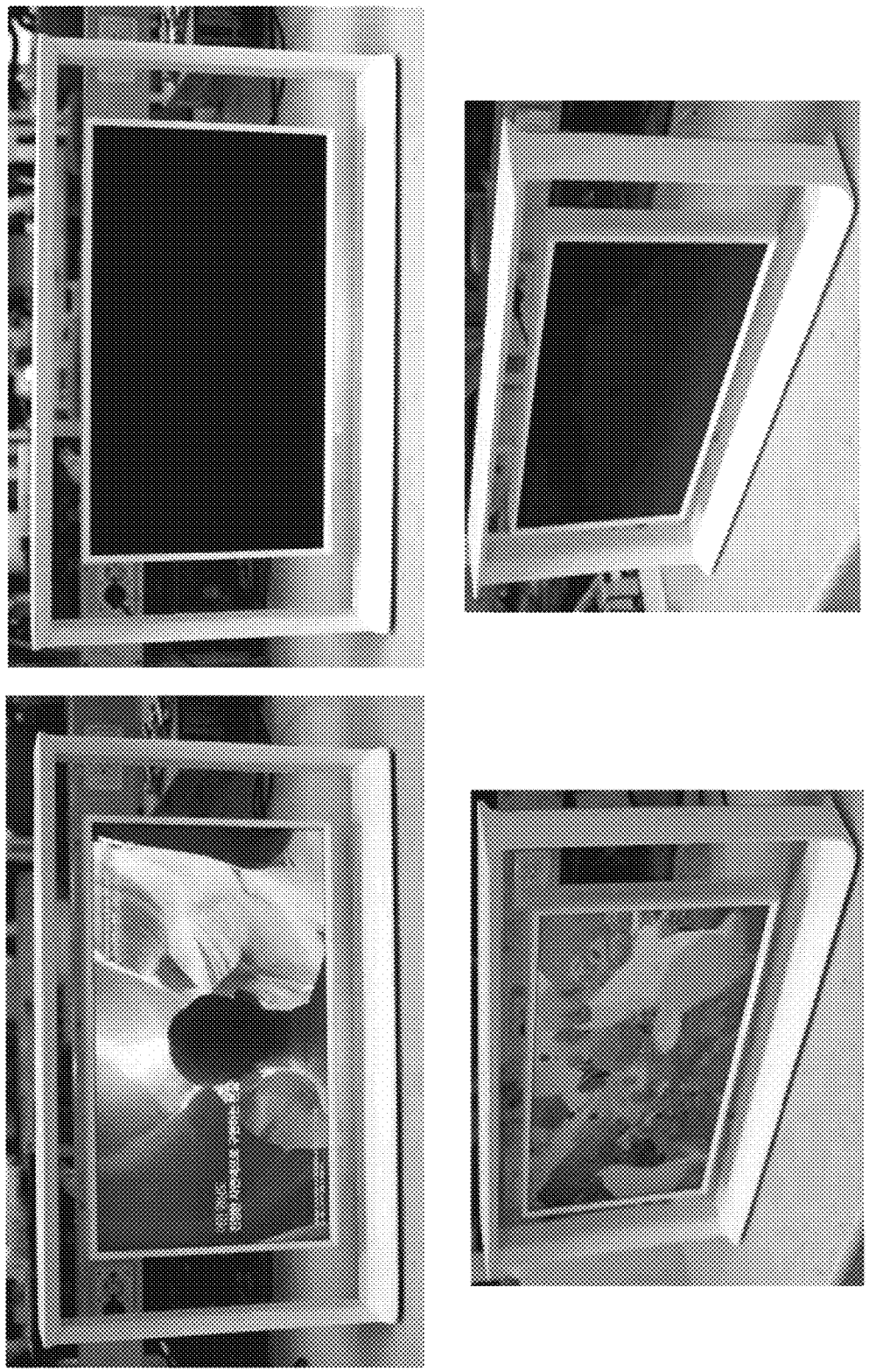
FIG. 12 illustrates photographs of a levitating display device according to an embodiment.

FIGS. 9 through 11 are views illustrating various methods of connecting a stand to a display device according to embodiments. Referring to FIGS. 9 and 10, in order to increase the effect that the panel unit 110 looks as if it is floating in the air, a stand 310 may be connected to the bottom of the frame unit 120. Referring to FIG. 11, when the stand 310 is connected to the panel unit 110, a neck portion 311 of the stand 310 may be formed of a transparent material to enhance aesthetics. In this case, not only the panel unit 110, but also the frame unit 120 may look as if they are floating in the air. FIG. 12 illustrates photographs of a levitating display device actually manufactured by the applicant according to an embodiment.

Figure 13:
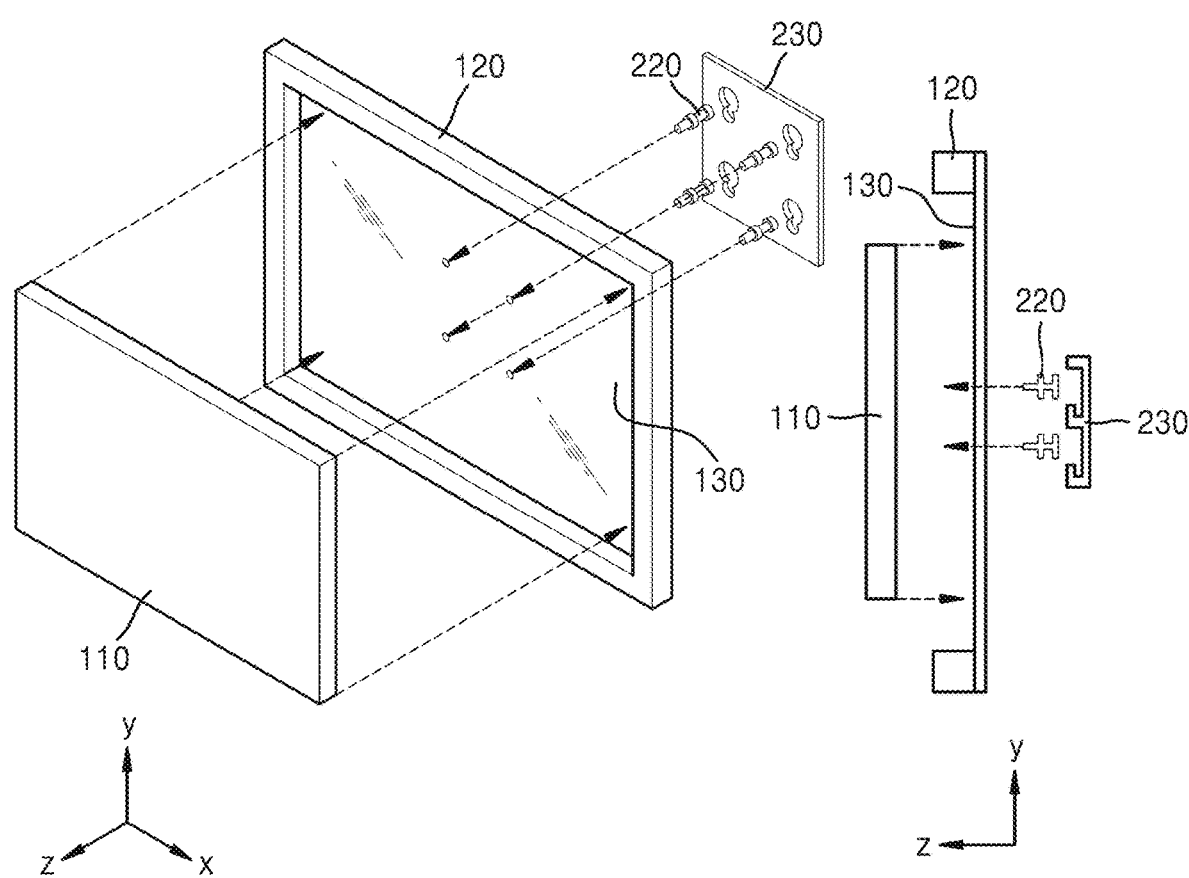
FIG. 13 is a view illustrating a method of installing a display device on a wall according to an embodiment.

FIG. 13 is a view illustrating a method of installing a display device on a wall according to an embodiment. Referring to FIG. 13, as described with reference to FIG. 8, the panel unit 110 may have a VESA standard mounting interface, and may be fixed to a wall-mount 230 by using one or more extension screws 220 according to the VESA standard.

Figure 14:
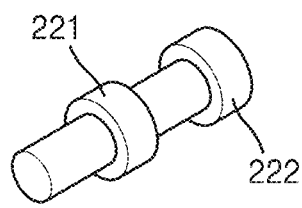
FIG. 14 is a view of an extension screw according to an embodiment.

FIG. 14 is a view of an extension screw according to an embodiment. Referring to FIG. 14, the extension screw 220 may have a two-step header structure. A front header 221 may be used to couple the panel unit 110 and the transparent support 130, and a rear header 222 may be fixed to the wall-mount 230 so as to fix the transparent support 130 to the wall mount 230.

That is, the panel unit 110 may have screw holes according to a VESA mounting interface standard, the transparent support 130 may have screw holes according to the VESA mounting interface standard, and the extension screw 220 may include the front header 221 that couples the panel unit 110 and the transparent support 130 and the rear header 222 that may be fixed to the wall-mount 230 according to the VESA mounting interface standard. The panel unit 110 and/or the frame unit 120 may be installed to be closely attached to the wall, or may be installed to be spaced apart by a certain distance from the wall for a desired effect.

Figure 15:
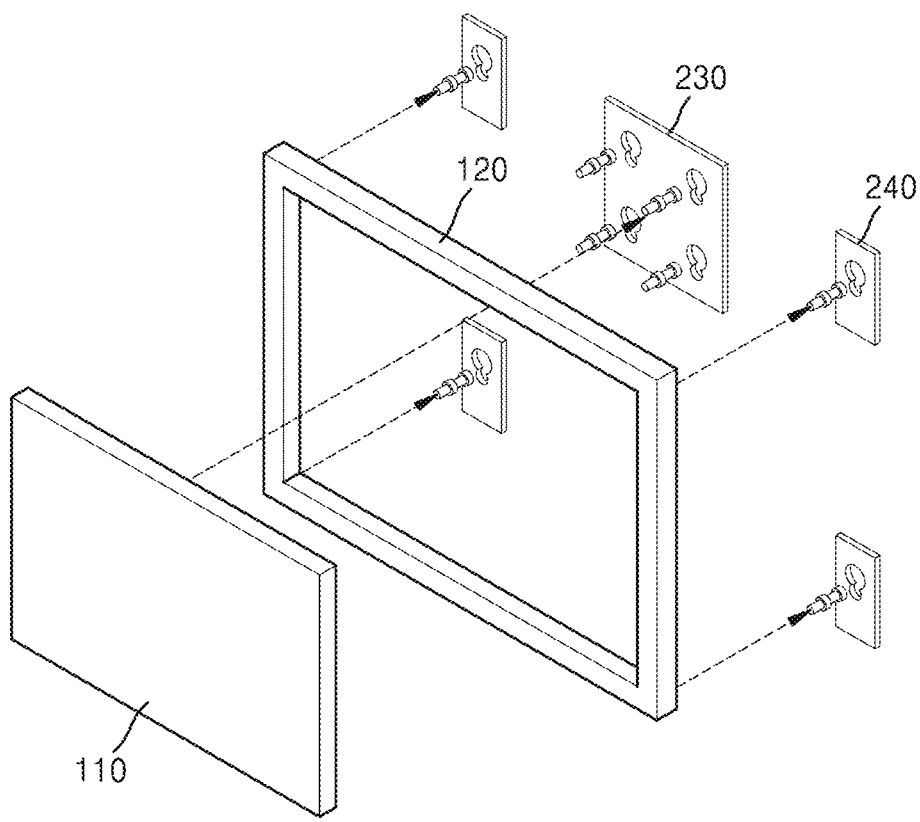
FIG. 15 is a view illustrating a method of installing a display device on a wall according to an embodiment.

FIG. 15 is a view illustrating a method of installing a display device on a wall according to an embodiment. Referring to FIG. 15, the frame unit 120 may also be fixed to a wall-mount 240, and in this case, the transparent support 130 for fixing the panel unit 110 and the frame unit 120 may not be required. That is, the panel unit 110 may have screw holes according to the VESA mounting interface standard to fix the panel unit 110 to the wall-mount 230, and the frame unit 120 may include a coupling member for fixing the frame unit 120 to the wall-mount 240. The coupling member for fixing the frame unit 120 to the wall-mount 240 may have a screw hole.

Figure 16:
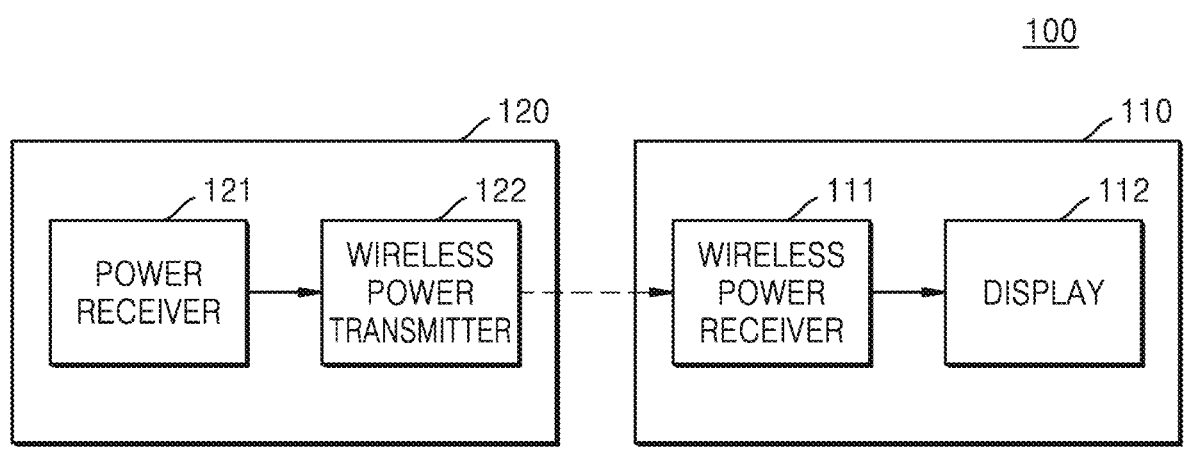
FIG. 16 is a diagram illustrating a display device according to an embodiment.

FIG. 16 is a diagram illustrating a display device according to an embodiment. Referring to FIG. 16, the frame unit 120 may include a power receiver 121 and a wireless power transmitter 122, and the panel unit 110 may include wireless power receiver 111 and a display 112. The power receiver 121 may receive power by wire or wirelessly from the outside. The wireless power transmitter 122 may wirelessly transmit power received by the power receiver 121. In this case, the wireless power transmitter 122 may wirelessly transmit part or the whole of the power received by the power receiver 121. The wireless power receiver 111 may wirelessly receive power from the wireless power transmitter 122 when the panel unit 110 and the frame unit 120 are spaced apart from each other. The display 112 may receive power from the wireless power receiver 111 and may display an image. As power is wirelessly transmitted from the frame unit 120 to the panel unit 110, an electric wire does not need to be provided between the frame unit 120 and the panel unit 110, thereby providing the effect that the panel unit 110 looks as if it is floating in the air to a user and enhancing aesthetic effect.

Figure 17:
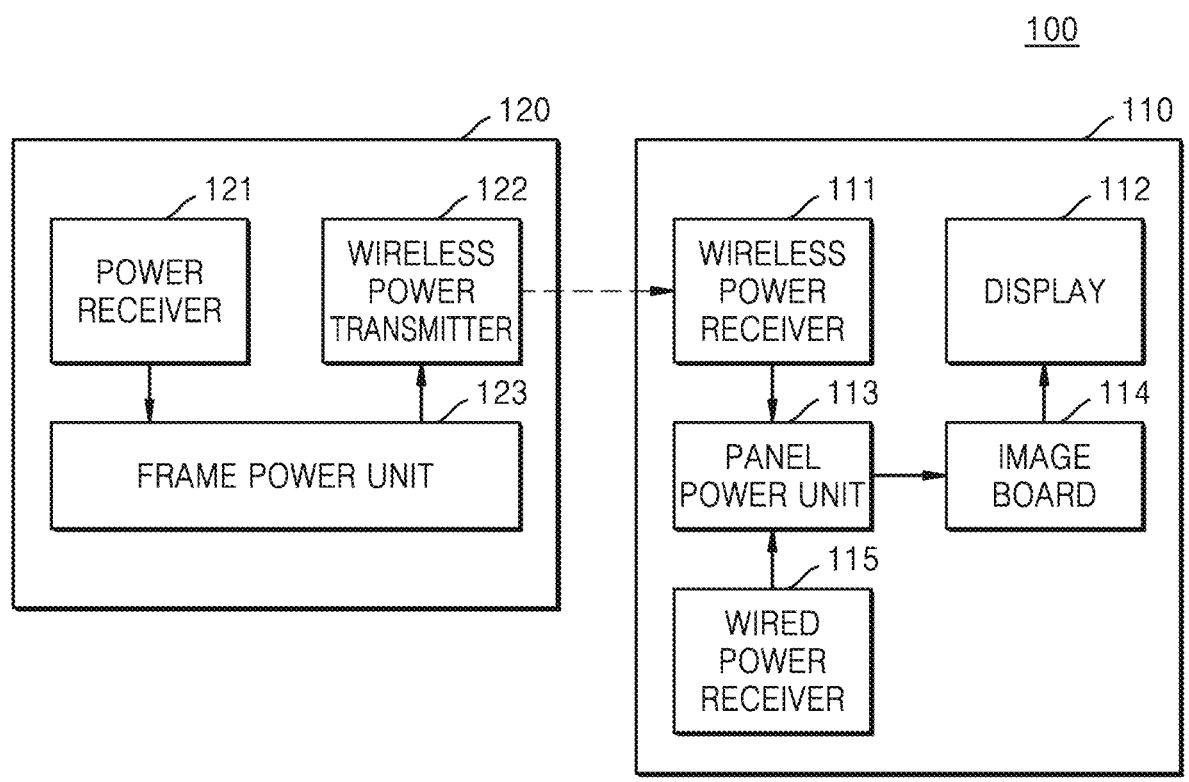
FIG. 17 is a detailed diagram illustrating a display device according to an embodiment.

FIG. 17 is a detailed diagram illustrating a display device according to another embodiment. Referring to FIG. 17, the frame unit 120 may further include a frame power unit 123. The frame power unit 123 may receive power from the power receiver 121, and may supply power to the wireless power transmitter 122. The panel unit 110 may further include a panel power unit 113 and an image board 114. The panel power unit 113 may receive power from the wireless power receiver 111, and may supply power to the image board 114. The image board 114 may supply power to the display 112 and may apply an image signal. The panel unit 110 may further include a wired power receiver 115. The panel power unit 113 may receive power from the wired power receiver 115. That is, the panel power unit 113 may receive power from the wireless power receiver 111 and/or the wired power receiver 115, and thus the panel unit 110 may operate by wirelessly receiving power from the frame unit 120, and/or may operate by separately receiving power by wire directly from an outlet without passing through the frame unit 120.

Figure 18:
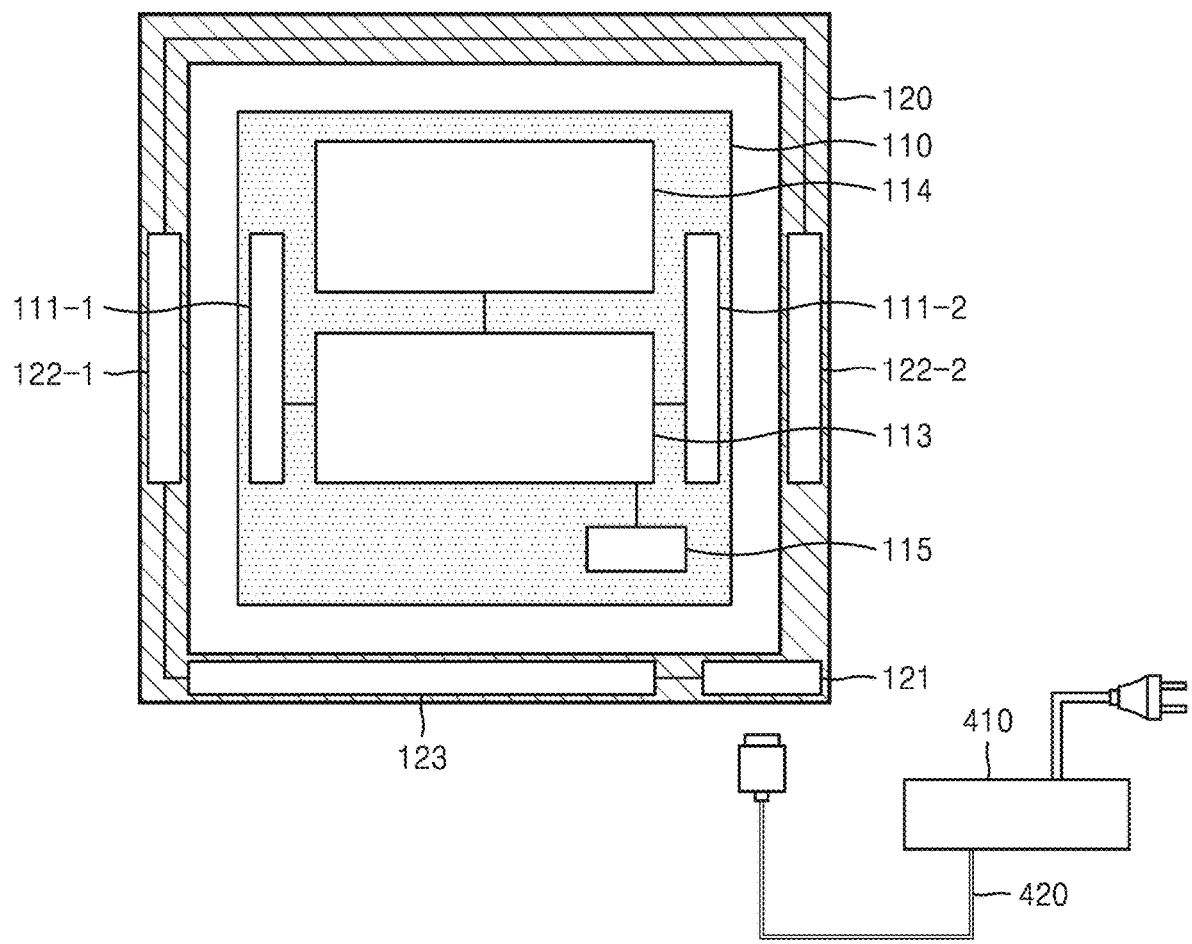
FIG. 18 is a view illustrating a display device and a method of connecting external power according to an embodiment.

FIG. 18 is a view illustrating a display device and a method of connecting external power according to an embodiment. Referring to FIG. 18, the wireless power transmitter 122 may include a plurality of power transmitters, and the wireless power receiver 111 may include a plurality of power receivers. For example, the wireless power transmitter 122 may include a first power transmitter 122-1 and a second power transmitter 122-2, and the panel unit 110 may include a first power receiver 111-1 and a second power receiver 111-2. The first power receiver 111-1 may receive power from the first power transmitter 122-1, and the second power receiver 111-2 may receive power from the second power transmitter 122-2.

The first power receiver 111-1 may be located on an edge of a side of the panel unit 110, and the second power receiver 111-2 may be located on an edge of the opposite side of the panel unit 110. That is, the first power receiver 111-1 and the second power receiver 111-2 may be located opposite to each other about the center of the panel unit 110. In this case, the first power receiver 111-1 and the second power receiver 111-2 are described as facing each other.

The first power transmitter 122-1 may be located outside the first power receiver 111-1, and the second power transmitter 122-2 may be located outside the second power receiver 111-2. That is, the first power transmitter 122-1 and the second power transmitter 122-2 may be located opposite to each other about the center of the panel unit 110 to face each other. The transparent support 130 may fix the frame unit 120 and the panel unit 110 so that the frame unit 120 and the panel unit 110 are spaced apart from each other, and the first power transmitter 122-1 is located outside the first power receiver 111-1 and the second power transmitter 122-2 is located outside the second power receiver 111-2. While the above examples describe only two power transmitters and receivers at respective locations, one or more embodiments are not limited thereto, and the number of power transmitter and power receiver and their respective locations may vary depending on the design of the frame unit and the panel unit.

The power receiver 121 of the frame unit 120 may receive power by wire from an external power unit 410. In this case, in order to enhance aesthetic effect, a transparent power line having a certain transmittance or more may be used as a cable 420 for connecting the receiver 121 and the external power unit 410.

Figure 19:
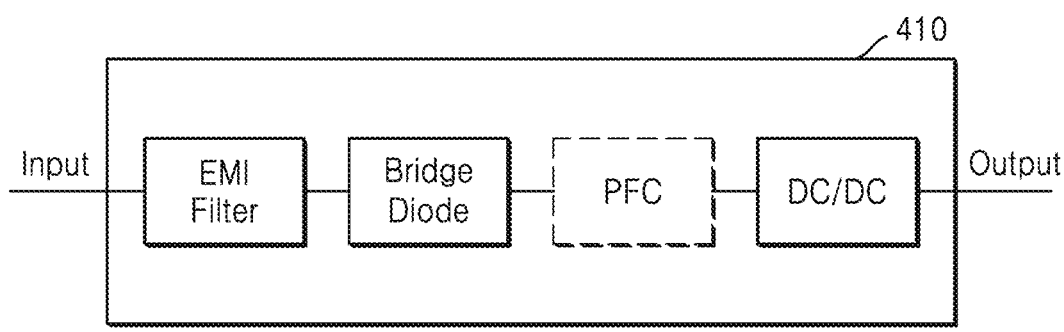
FIG. 19 is a diagram illustrating an external power unit according to an embodiment.

FIG. 19 is a diagram illustrating an external power unit according to an embodiment. Referring to FIG. 19, the external power unit 410 may include an electromagnetic interference (EMI) filter, a bridge diode, a power factor correction (PFC) circuit, and a direct current (DC)/DC converter. When necessary, some elements may be omitted. For example, when power is less than 75 W, the PFC circuit may be omitted.

The power receiver 121 may directly receive power from an alternating current (AC) power source without passing through the external power unit 410. In this case, as an EMI filter, a bridge diode, and a PFC circuit are included in the frame power unit 123 and a volume of the frame power unit 123 may increase. In such a case, a design of the frame unit 120 may be affected.

The wired power receiver 115 of the panel unit 110 may also receive power by wire from the external power unit 410. The power receiver 121 of the frame unit 120 and the wired power receiver 115 of the panel unit 110 may include the same power receiving interface, so that the same external power unit 410 is used for both the frame unit 120 and the panel unit 110.

FIGS. 20A-20D are views illustrating various arrangements of a wireless power transmitter and a wireless power receiver according to one or more embodiments. Only some reference numerals are shown in FIGS. 20A-20D for convenience.

Referring to FIGS. 20A and 20B, power transmitter/receiver pairs 111-1 and 122-1, and 111-2 and 122-2 may face each other.

Referring to FIG. 20C, the power transmitter/receiver pairs 111-1 and 122-1, and 111-2 and 122-2 may be located on a side of the panel unit 110. That is, the wireless power receiver 111 may include the first power receiver 111-1 located on a side of the panel unit 110, and the second power receiver 111-2 located on the same side of the panel unit 110. The wireless power transmitter 122 may include the first power transmitter 122-1 located on a side of the frame unit 120, and the second power transmitter 122-2 located on the same side of the frame unit 120. The first power receiver 111-1 and the second power receiver 111-2 may be aligned with each other. When the first power receiver 111-1 and the second power receiver 111-2 are aligned with each other, it means that the first power receiver 111-1 and the second power receiver 111-2 are aligned with each other along a rim of the panel unit 110. The rim may be a side of a polygon when the panel unit 110 has a polygonal shape, and may be an arc when the panel unit 110 has a circular shape. The first power transmitter 122-1 and the second power transmitter 122-2 may be aligned with each other. When the first power transmitter 122-1 and the second power transmitter 122-2 are aligned with each other, it means that the first power transmitter 122-1 and the second power transmitter 122-2 are aligned with each other along a frame of the frame unit 120. The alignment may include not only complete alignment, but also substantial alignment. An arrangement in FIG. 20C is especially useful when there are no frames facing each other as shown in FIG. 6.

Referring to FIG. 20D, power transmitter/receiver pairs may face each other in various directions, for example, vertically and horizontally, about the center of the panel unit 110. Here, the power transmitter/receiver pairs may be disposed on each of four sides of the panel unit 110 and the frame unit 120.

FIGS. 21A-21C are views illustrating various alignment relationships between a frame unit and a panel unit of a display device according to an embodiment. Only some reference numerals are shown in FIGS. 21A-21C for convenience.

FIG. 21B illustrates a case where the panel unit 110 is located at the center of the frame unit 120, FIG. 21A illustrates a case where the panel unit 110 is located at a position shifted upward from the center of the frame unit 120, and FIG. 21C illustrates a case where the panel unit 110 is located at a position shifted downward from the center of the frame unit 120. That is, FIG. 21A through 21C illustrate various situations in which an alignment relationship between the panel unit 110 and the frame unit 120 may vary. For example, the alignment relationship between the panel unit 110 and the frame unit 120 may vary when the panel unit 110 and the frame unit 10 are not installed at correct positions, when a process of installing or assembling the panel unit 110 and the frame unit 120 is being performed, when positions of the panel unit 110 and the frame unit 120 are distorted after installation or assembly, or when positions of the panel unit 110 and the frame unit 120 are intentionally adjusted to enhance aesthetics.

Furthermore, a power transmission efficiency decreases as a distance between a power transmitter and a power receiver increases during a wireless power transmission. Referring to FIG. 21A, because a distance between the wireless power transmitter 122 and the wireless power receiver 111 is greater than that in FIG. 21B, a power transmission amount of FIG. 21A may be less than that of FIG. 21B. Referring to FIG. 21C, because a distance between the wireless power transmitter 122 and the wireless power receiver 111 is less than that in FIG. 21B, more power may be transmitted. In order to make up for a phenomenon where a power transmission amount varies according to an alignment relationship between the panel unit 110 and the frame unit 120, power transmitter/receiver pairs may face each other.

Figures 22A, 22B, 22C:
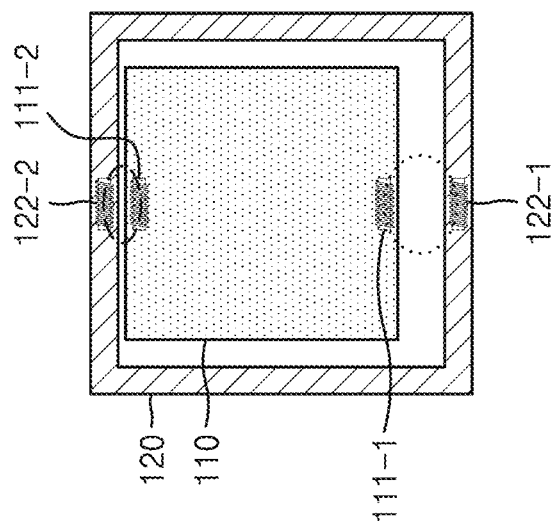
FIGS. 22A-22C are views illustrating an un-alignment compensation method of a display device according to an embodiment.

FIGS. 22A-22C are views illustrating a un-alignment compensation method of a display device according to an embodiment. Only some reference numerals are shown in FIGS. 22A-22C for convenience.

Referring to FIG. 22A, because the panel unit 110 is located at a position shifted upward, a distance between the first power transmitter 122-1 and the first power receiver 111-1 increases and thus a power transmission amount between the first power transmitter 122-1 and the first power receiver 111-1 may decrease. In contrast, a distance between the second power transmitter 122-2 and the second power receiver 111-2 decreases and thus a power transmission amount between the second power transmitter 122-2 and the second power receiver 111-2 may increase. Accordingly, the total amount of power received by the panel unit 110 may not change significantly. The same principle or method may apply to FIG. 21C. That is, when power transmitter/receiver pairs face each other and a distance between one power transmitter/receiver pair decreases as a distance between another power transmitter/receiver pair increases, a decrease in power transmission efficiency due to un-alignment between a frame unit and a panel unit may be compensated. In other words, by providing a second transmitter/receiver pair at a location opposite from a first transmitter/receiver pair, the second transmitter/receiver pair may compensate for the power loss due an increased distance between the first transmitter and the first receiver because a distance between the second transmitter and the second receiver will decrease by the same amount of the increased distance between the first transmitter and the first receiver. Accordingly, the second transmitter/receiver may recapture or restore the power loss by the first transmitter/receiver pair.

Figure 23:
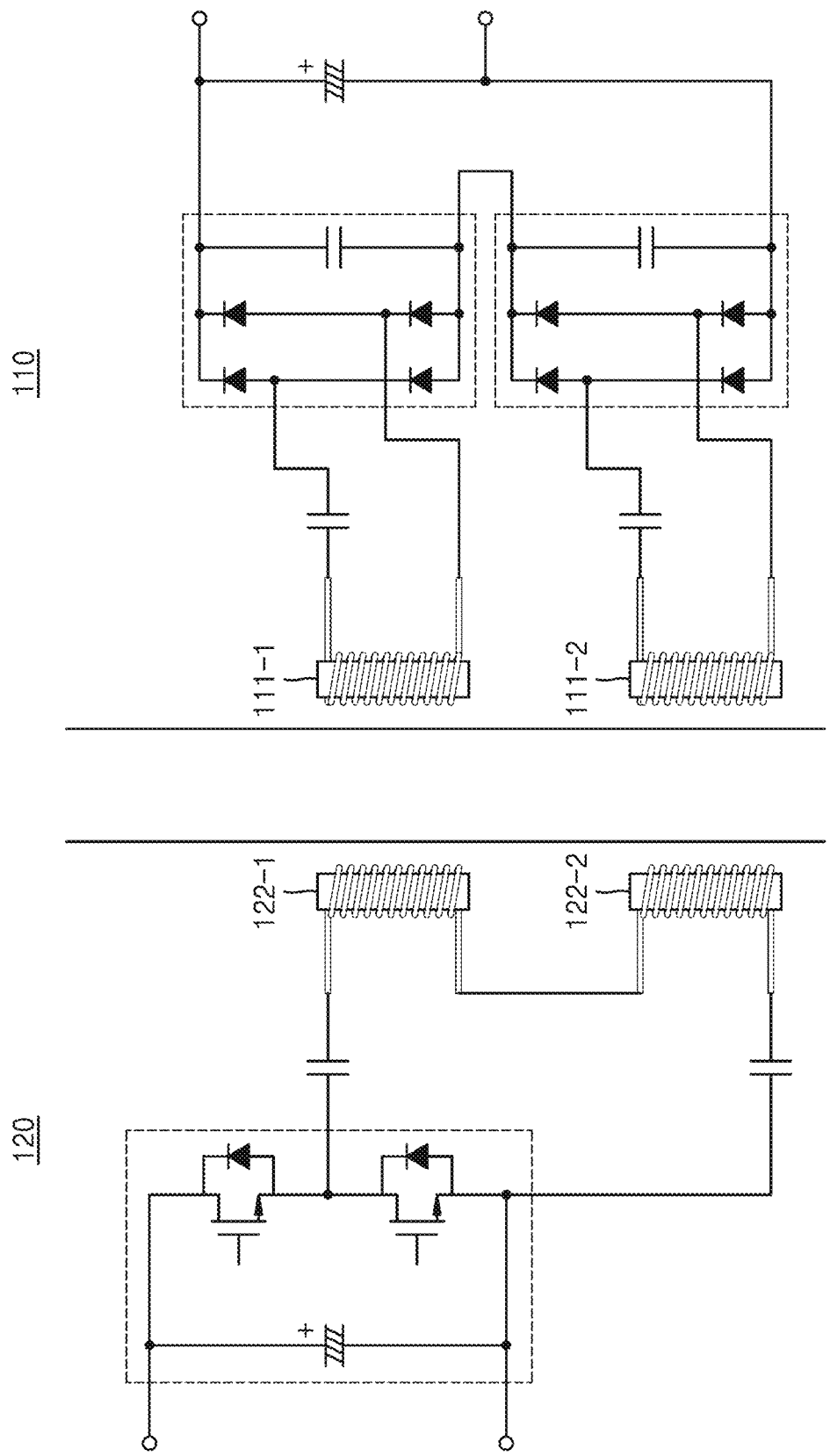
FIG. 23 is a circuit diagram illustrating a method of connecting wireless power receivers according to an embodiment.

FIG. 23 is a view illustrating a method of connecting wireless power receivers according to an embodiment. Referring to FIG. 23, the first power receiver 111-1 and the second power receiver 111-2 are electrically connected in series to each other. Specifically, output terminals of the first power receiver 111-1 and the second power receiver 111-2 are connected in series to each other so that an output voltage of the first power receiver 111-1 and an output voltage of the second power receiver 111-2 are added with the same polarity. A magnitude of a transmitted voltage increases as a coupling degree between a transmitter and a receiver increases. Accordingly, when two power receivers are connected in this way, even if an output voltage of one of the two receivers increases and an output voltage of the other decreases due to un-alignment between a frame unit and a panel unit as described above with reference to FIGS. 22A-22C, a sum of voltages of the two receivers does not substantially change, and thus a stable output voltage may be obtained. For example, when an output voltage of the first power receiver 111-1 decreases, an output voltage of the second power receiver 111-2 increases. That is, the panel unit 110 may receive stable power even when no or little additional control is performed for compensation of un-alignment. The first power transmitter 122-1 and the second power transmitter 122-2 may also be connected in series to each other.

The wireless power transmitter 122 may include a bar-shaped transmitting resonator that may be inserted into a thin frame. The wireless power receiver 111 may also include a bar-shaped receiving resonator corresponding to the transmitting resonator of the wireless power transmitter 122. Each of the transmitting resonator and the receiving resonator may be implemented as a solenoid.

Figure 24:
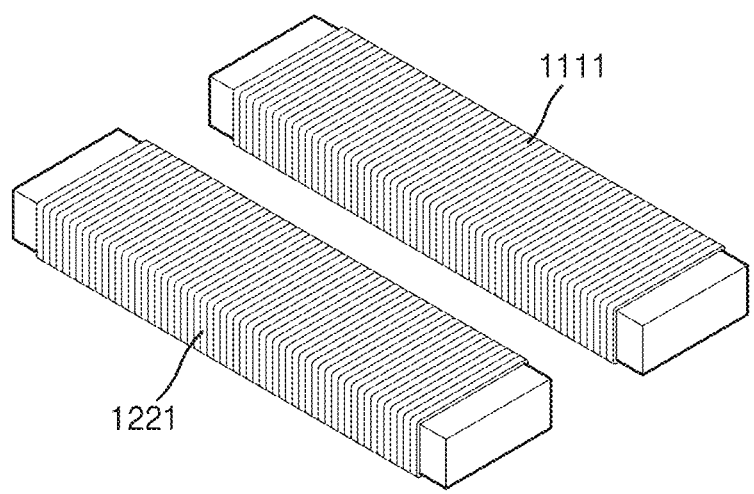
FIG. 24 is a view illustrating a bar-shaped transmitting resonator and a bar-shaped receiving resonator according to an embodiment.

FIG. 24 is a view illustrating a bar-shaped transmitting resonator 1221 and a bar-shaped receiving resonator 1111 respectively used in the wireless power transmitter 122 and the wireless power receiver 111 according to an embodiment. In another embodiment, each of the bar-shaped transmitting resonator 1221 and the bar-shaped receiving resonator 1111 may have a slightly curved shape rather than a straight line shape. In addition, two or more pairs of bar-shaped transmitting resonators 1221 and bar-shaped receiving resonators 1111 may be provided.

When the bar-shaped transmitting resonator 1221 and the bar-shaped receiving resonator 1111 are located side by side, the bar-shaped transmitting resonator 1221 and the bar-shaped receiving resonator 1111 may transmit/receive power. When two resonators are located side by side, it means that the two resonators extend in the same direction and are located to overlap each other in an extension direction, that is, a longitudinal direction, of the two resonators. In other words, when the two resonators are straight, the two resonators are located side by side like one pair of chopsticks.

The bar-shaped receiving resonator 1111 may be located on an edge of a side of the panel unit 110 extending in a rim direction of the panel unit 110. That is, the wireless power receiver 111 may include the bar-shaped receiving resonator 1111 located on the edge of the side of the panel unit 110 and extending in the rim direction of the panel unit 110. Similarly, the wireless power transmitter 122 may include the bar-shaped transmitting resonator 1221 that may wirelessly transmit power to the bar-shaped receiving resonator 1111, and the bar-shaped transmitting resonator 1221 is located side by side with the bar-shaped receiving resonator 1111. The bar-shaped transmitting resonator 1221 may extend in a frame direction of the frame unit 120. The frame unit 120 and the panel unit 110 may be spaced apart from each other and may be fixed to the transparent support 130 so that the bar-shaped transmitting resonator 1221 is located side by side with the bar-shaped receiving resonator 1111.

Figure 25:
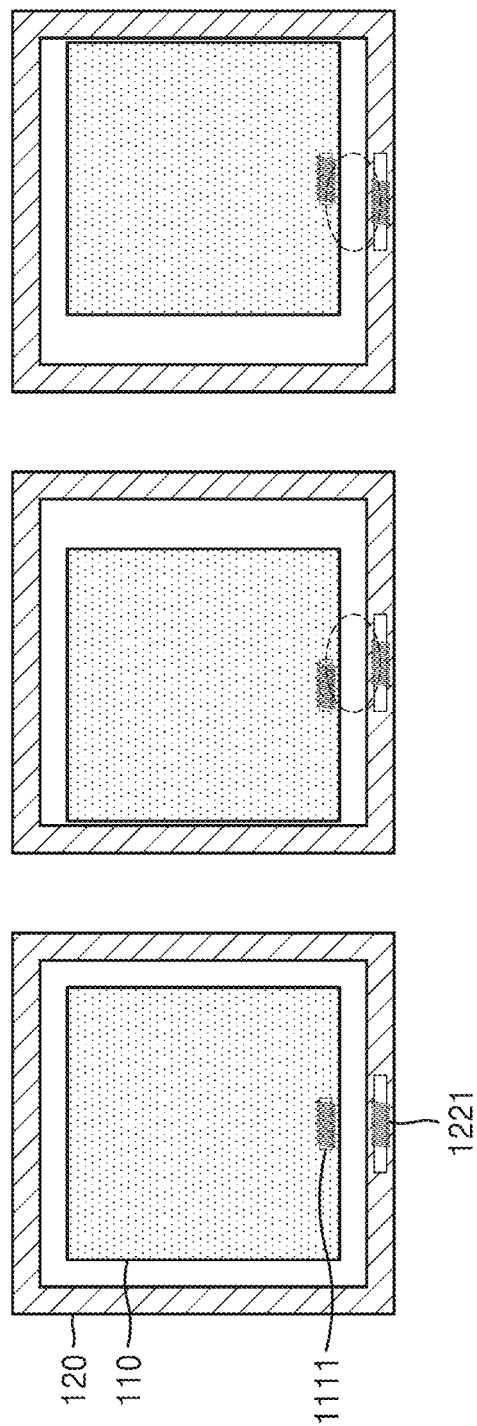
FIGS. 25A-25C are views of an un-alignment compensation method of a display device according to an embodiment.

FIGS. 25A-25C are views of a un-alignment compensation method of a display device according to an embodiment. Only some reference numerals are shown in FIGS. 25A-25C for convenience.

Referring to FIGS. 25A-25C, when a length of the bar-shaped transmitting resonator 1221 is greater than a length of the bar-shaped receiving resonator 1111, the panel unit 110 may stably receive power even when the panel unit 110 is located at a position shifted leftward or rightward from the center of the frame unit 120 as in FIG. 25B or FIG. 25C. Also, the same effect may be achieved even when a length of the bar-shaped receiving resonator 1111 is greater than a length of the bar-shaped transmitting resonator 1221. That is, by making lengths of transmitting/receiving resonators asymmetric to each other, un-alignment in an extension direction of the transmitting/receiving resonators, that is, a longitudinal direction of the transmitting/receiving resonators may be compensated for. At this time, the shorter resonator of the two resonators has to have a length enough to transmit sufficient power. A length difference between the two resonators increases, a un-alignment range that may be compensated may increase. For example, a length of the longer resonator of the two resonators may be 10%, 30%, or 50% greater than a length of a shorter resonator.

Figure 26:
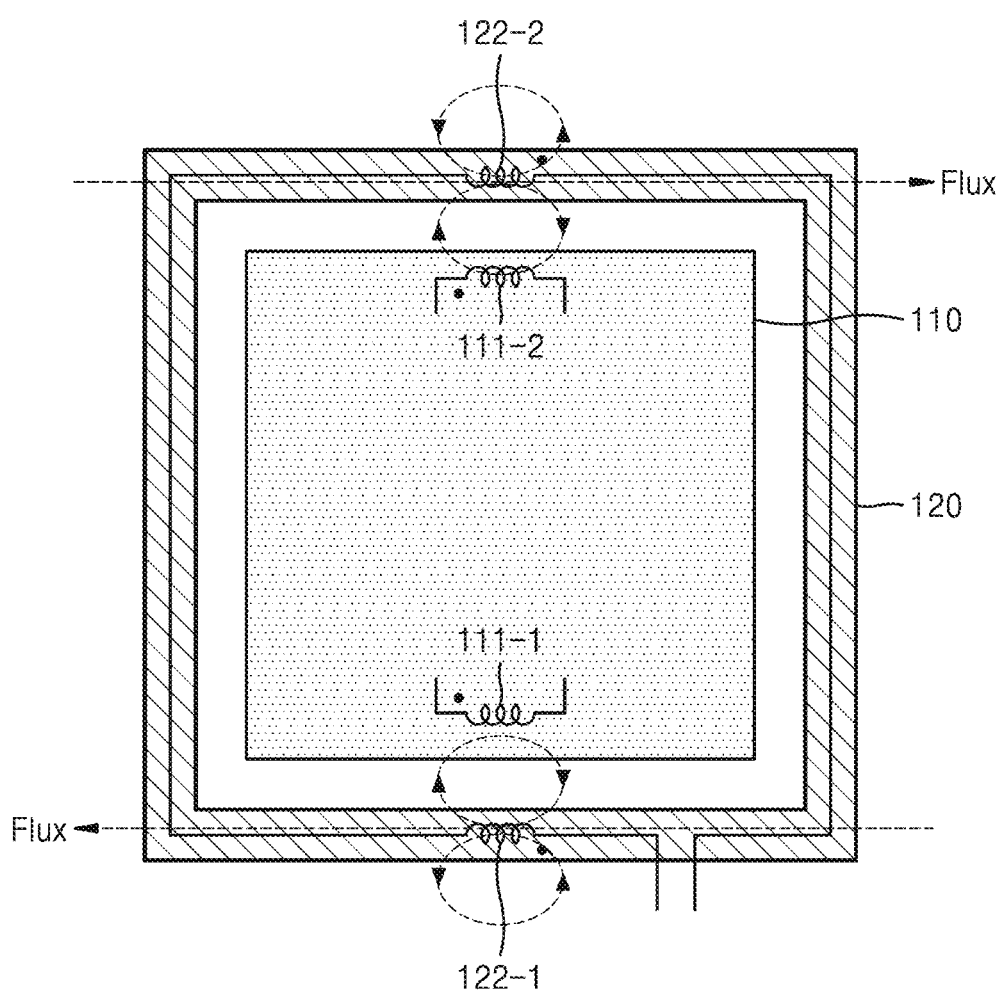
FIG. 26 is a view of a method of reducing electromagnetic interference (EMI) of a display device according to an embodiment.

FIG. 26 is a view illustrating a method of reducing EMI of a display device according to an embodiment. A magnetic flux generated by the wireless power transmitter 122 of the frame unit 120 may be radiated into a free space to cause EMI. EMI may be reduced by allowing a magnetic flux generated by the first power transmitter 122-1 and a magnetic flux generated by the second power transmitter 122-2 to be generated in opposite directions as shown in FIG. 26. When each power transmitter includes a bar-shaped transmitting resonator, magnetic fluxes may be generated in opposite directions by adjusting a winding direction of the bar-shaped transmitting resonator. In this case, the first power transmitter 122-1 and the second power transmitter 122-2 may face each other as shown in FIG. 26, or the first power transmitter 122-1 and the second power transmitter 122-2 may be located at respective sides of the panel unit 110. The latter case may have low power transmission efficiency, but may be used when there are no frames facing each other as shown in FIG. 6.

The first power receiver 111-1 and the second power receiver 111-2 of the panel unit 110 may be connected in series to each other so that output voltages formed according to magnetic fluxes generated in opposite directions are added with the same polarity. In this case, the first power receiver 111-1 and the second power receiver 111-2 may face each other, or may be located at respective sides of the panel unit 110.

Figure 27:
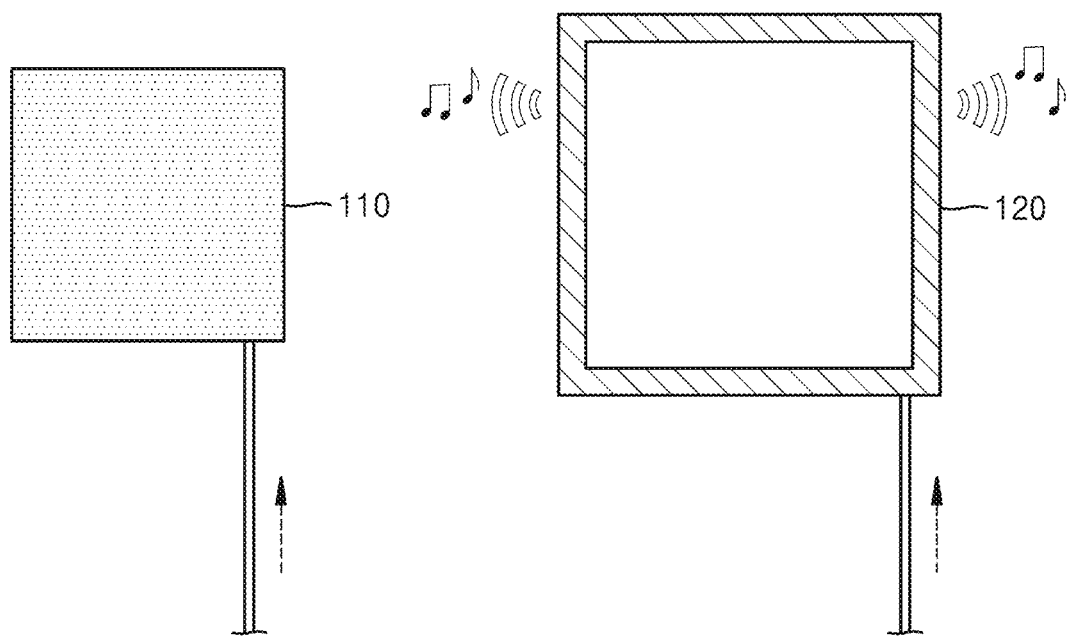
FIG. 27 is a view illustrating a case where a panel unit and a frame unit separately operate according to an embodiment.

FIG. 27 is a view illustrating a case where a panel unit and a frame unit separately operate according to an embodiment.

Because the panel unit 110 may receive power by wire through the wired power receiver 115 as described above, the panel unit 110 may separately operate without the frame unit 120. That is, the display 112 may receive power from the wired power receiver 115 and may display an image.

Also, the frame unit 120 may separately operate without the panel unit 110. That is, the frame unit 120 may include an auxiliary functional unit that may operate independently from the panel unit 110, and may perform a useful function. When the frame unit 120 operates independently from the panel unit 110, it means that the frame unit 120 may operate without the panel unit 110. For example, the frame unit 120 may include a speaker, a sensor, or a lighting device, and may operate as a speaker or an interior lighting device when the panel unit 110 is not operating or displaying an image. The auxiliary functional unit also receives power received by the power receiver 121. In this case, the frame unit 120 may determine that the panel unit 110 is not operating and may prevent unnecessary power consumption by turning off a circuit for wireless power transmission. That is, the wireless power transmitter 122 may determine whether the panel unit 110 exists at a distance in which wireless power transmission is possible, and may turn on or off wireless power transmission according to the determination.

When power is simultaneously supplied by wire to the frame unit 120 and the panel unit 110, voltage collision may occur between an output of the wireless power receiver 111 and an output of the wired power receiver 115 of the panel unit 110. In order to prevent the voltage collision, the frame unit 120 may selectively use one of the wireless power receiver 111 and the wired power receiver 115. For example, the display 112 may receive power from the wired power receiver 115 at a higher priority than from the wireless power receiver 111.

Figure 28:
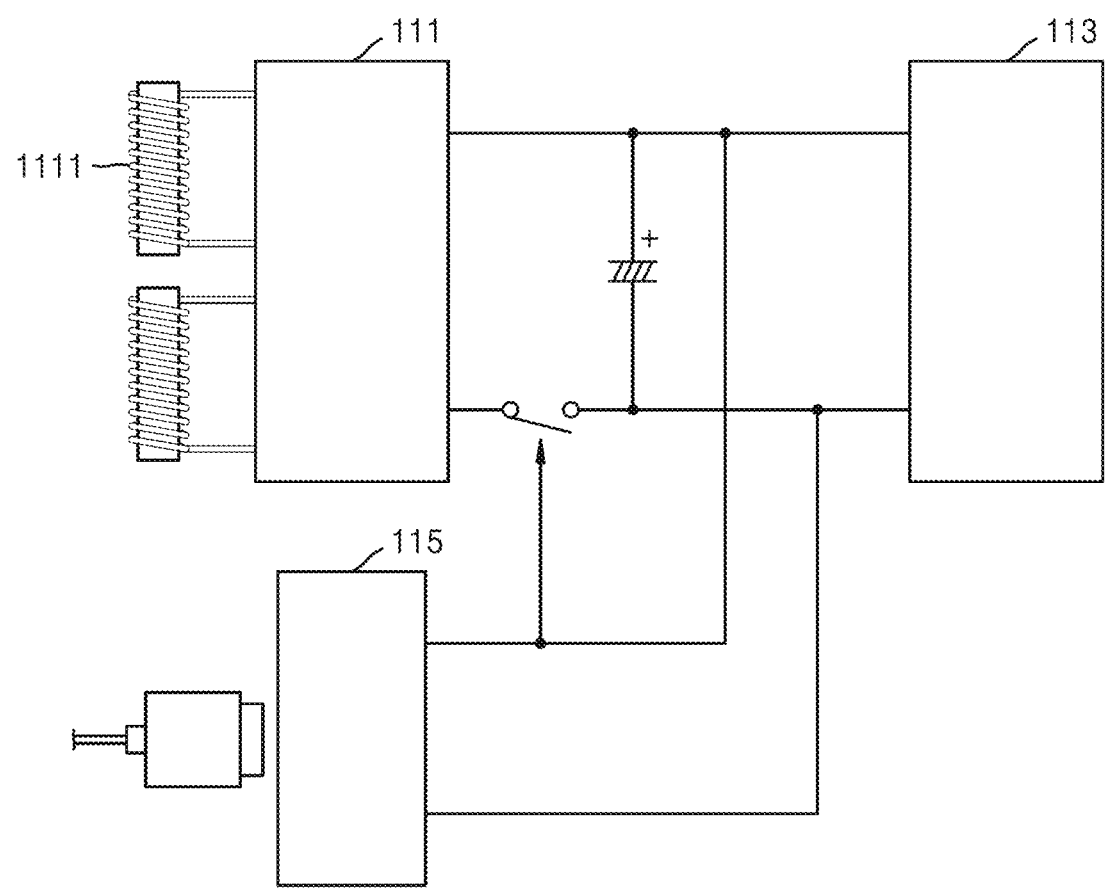
FIG. 28 is a view illustrating a wired power preference circuit of a panel unit according to an embodiment.
Figure 29:
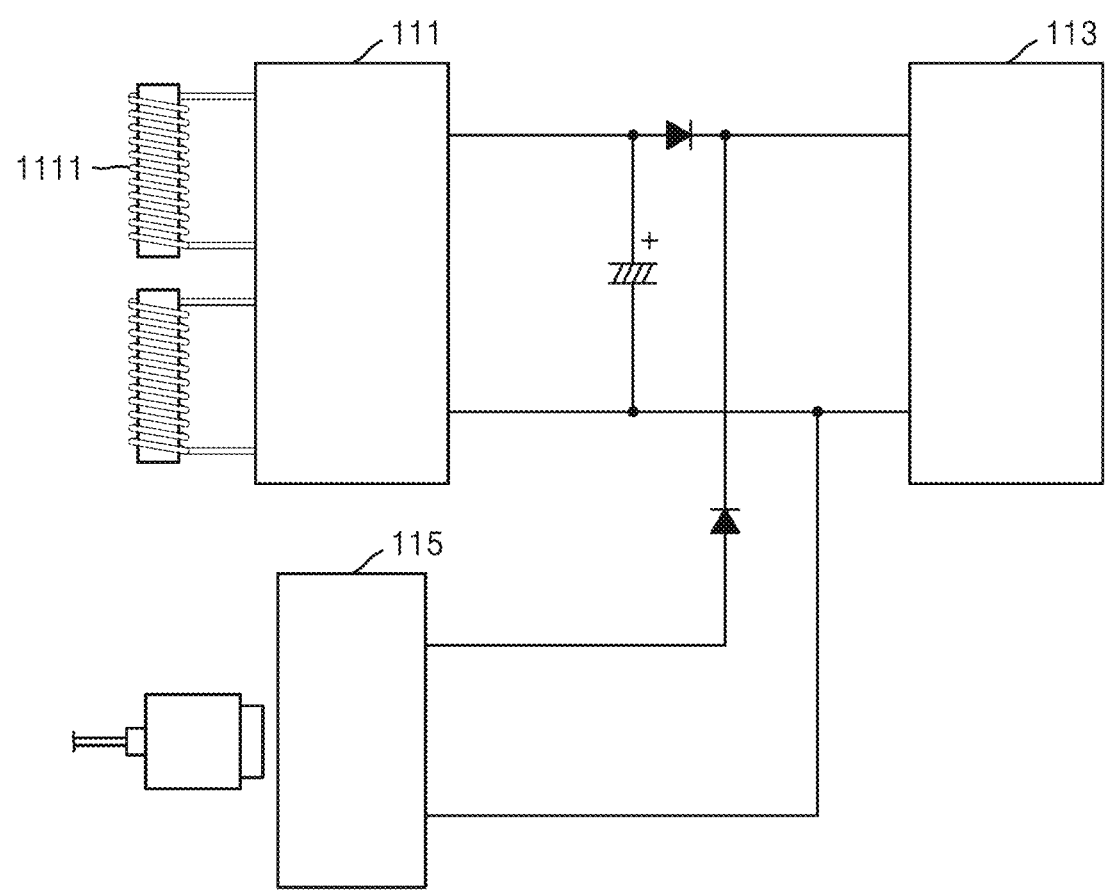
FIG. 29 is a view illustrating a diode O-ring circuit of a panel unit, according to an embodiment.

In an embodiment, by using a wired power preference circuit as shown in FIG. 28, when power is received by the wired power receiver 115, the panel power unit 113 may receive power from the wired power receiver 115 without receiving power from the wireless power receiver 111. In another embodiment, by using a diode Oring circuit as shown in FIG. 29, the panel power unit 113 may receive power from at least one, which has a higher output voltage, from among the wireless power receiver 111 and the wired power receiver 115. In general, because an output voltage of the wireless power receiver 111 is equal to or less than an output voltage of the wired power receiver 115, the panel power unit 113 selectively receives power from the wired power receiver 115.

Various methods using which the panel unit 110 receives an image signal will be described with reference to FIGS. 30 and 31.

Figure 30:
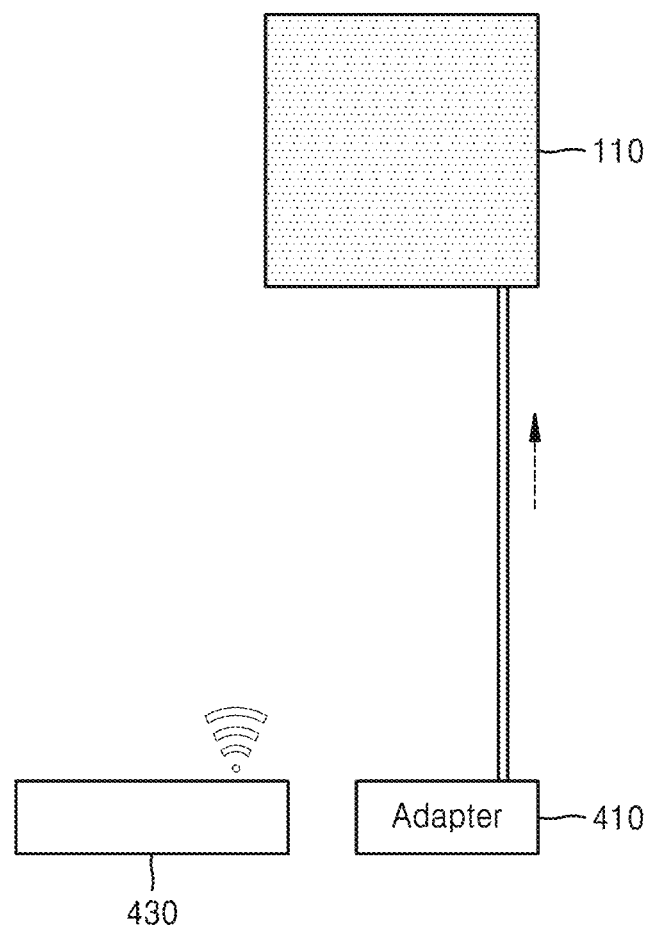
FIG. 30 is a view illustrating a method in which a panel unit receives an image signal according to an embodiment.

Referring to FIG. 30, the panel unit 110 may receive power by wire from the external power unit 410 without the frame unit 120, and may receive an image signal through wireless communication from an imaging device 430. In this case, the wireless communication may be long-range wireless communication.

Also, the panel unit 110 may receive power by wire without the frame unit 120, and may also receive an image signal by wire. In this case, the panel unit 110 may receive power and an image signal from a one connection (OC) box 440 through an OC cable.

The panel unit 110 may receive power through wireless power transmission from the frame unit 120, and may also receive an image signal through wireless communication. In this case, the wireless communication may be long-range wireless communication. The frame unit 120 may receive power by wire from the external power unit 410 or the OC box 440, and the panel unit 110 may receive an image signal through wireless communication from the OC box 440 that supplies power to the frame unit 120 or the imaging device 430.

Figure 31:
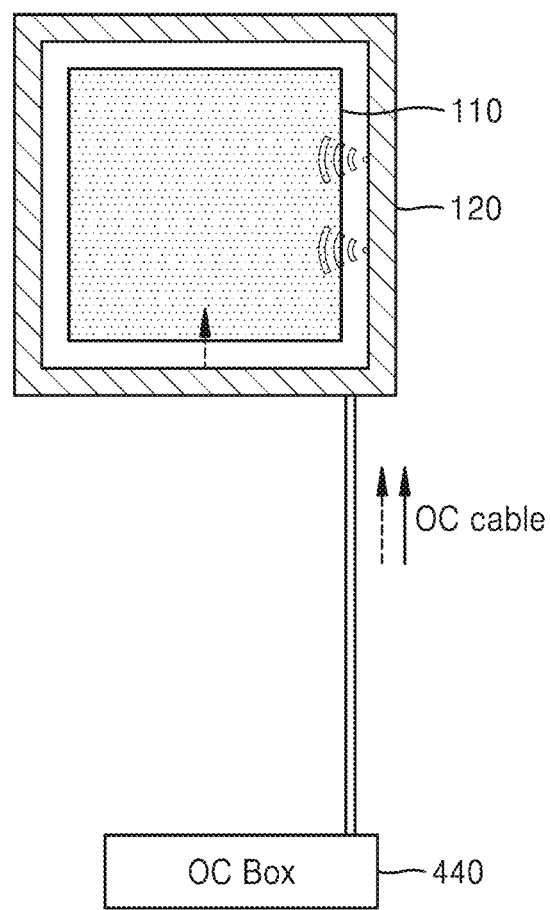
FIG. 31 is a view illustrating a method in which a panel unit receives an image signal according to an embodiment.

Referring to FIG. 31, the panel unit 110 may receive power through wireless power transmission from the frame unit 120, and may also receive an image signal through wireless communication from the frame unit 120. In this case, because the panel unit 110 and the frame unit 120 are located close to each other, the panel unit 110 may transmit an image signal through short-range wireless communication. That is, the frame unit 120 may include an image receiver and a short-range wireless transmitter that transmits through short-range wireless communication an image signal received by the image receiver, and the panel unit 110 may include a short-range wireless receiver that may receive an image signal through short-range wireless communication from the short-range wireless transmitter when the panel unit 110 is spaced apart from the frame unit 120. When a distance between the panel unit 110 and the frame unit 120 is several centimeters or less, 4 K or higher image signal transmission may be performed. The display 112 may display an image based on an image signal received by the short-range wireless receiver. The short-range wireless transmitter of the frame unit 120 may transmit an image signal received from the image receiver, or may process an image signal received from the image receiver to be suitable for short-range wireless communication and may transmit the processed image signal. The frame unit 120 may receive power and an image signal from the OC box 440 through the OC cable.

A user may change a size, a color, a pattern, a shape, and an additional function of a frame by replacing only the frame unit 120 while leaving the panel unit 110 as is. Also, the user may replace the panel unit 110 with one having better performance or a different design while leaving the frame unit 120 as is.

Figure 32:
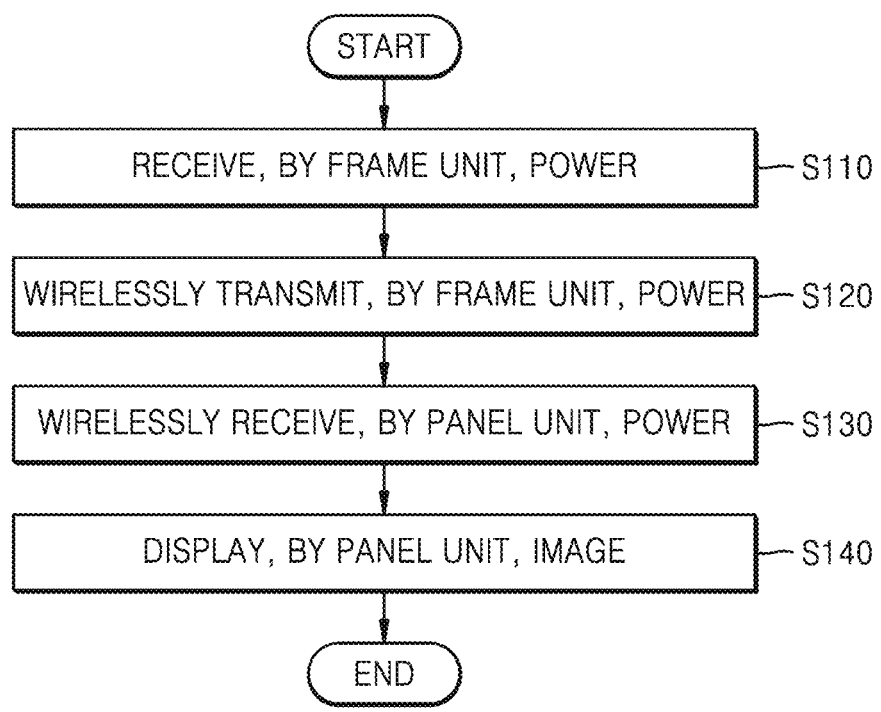
FIG. 32 is a flowchart illustrating an operating method of a display device according to an embodiment.

FIG. 32 is a flowchart illustrating an operating method of a display device according to an embodiment. Referring to FIG. 32, in operation S110, the frame unit 120 may receive power from the outside (e.g., an outlet). In operation S120, the frame unit 120 may wirelessly transmit the received power. In operation S130, the panel unit 110 may wirelessly receive power from the frame unit 120 when being spaced apart from the frame unit 120. In operation S140, the panel unit 110 may display an image.

Embodiments of the disclosure may be provided as a computer-executable program product, and the program may be stored in a non-transitory computer-readable recording medium. Examples of the computer-readable recording medium include all recording media such as a magnetic medium, an optical medium, read-only memory (ROM), and random-access memory (RAM).

While the disclosure has been particularly shown and described with reference to embodiments thereof, the embodiments are non-limiting examples of the disclosure, and should be considered in a descriptive sense only and not for purposes of limitation. It will be understood by one of ordinary skill in the art that the embodiments may be modified into other forms all without changing the technical spirit or the features of the disclosure. For example, each component described as a single type may be executed in a distributed manner, and components described as a distributed type may be executed in a combined type. While the embodiments of the disclosure has been described by using specific terms, the terms have been used to explain the disclosure and should not be construed as limiting the concept or scope of the disclosure as defined by the claims. Operations of the disclosure may not need to be performed in the described order, and may be performed in parallel, selectively, or individually.

It should be understood that all modifications, substitutions, or improvements drawn from the inventive concept and scope of the disclosure and equivalents thereof fall within the scope of the disclosure.

What is claimed is:

1. A display device comprising:
a panel unit;
a frame unit configured to enclose the panel unit, and
a transparent support to which the frame unit and the panel unit that are spaced apart from each other are fixed,
wherein the frame unit comprises:
a power receiver, and
a wireless power transmitter configured to wirelessly transmit power received by the power receiver to the panel unit, and
wherein the panel unit comprises:
a wireless power receiver configured to wirelessly receive the power from the wireless power transmitter, and
a display configured to receive the power from the wireless power receiver and display an image,
wherein the wireless power receiver comprises:
a first power receiver located on an edge of a first side of the panel unit, and
a second power receiver located on an edge of a second side opposite to the first side of the panel unit, and
wherein the wireless power transmitter comprises:
a first power transmitter located on a first side of the frame unit, and configured to wirelessly transmit a first power to the first power receiver, and
a second power transmitter located on a second side of the frame unit, and configured to wirelessly transmit a second power to the second power receiver.

2. The display device of claim 1, wherein the frame unit encloses the panel unit from a front view.

3. The display device of claim 1, wherein the wireless power receiver comprises a bar-shaped receiving resonator located on an edge of a side of the panel unit and extending in a rim direction of the panel unit, and
wherein the wireless power transmitter comprises a bar-shaped transmitting resonator configured to wirelessly transmit the power to the bar-shaped receiving resonator based on the bar-shaped transmitting resonator and the bar-shaped receiving resonator being located side by side.

4. The display device of claim 3, wherein the bar-shaped transmitting resonator and the bar-shaped receiving resonator are located side by side.

5. The display device of claim 3, wherein a first length of the bar-shaped transmitting resonator is different from a second length of the bar-shaped receiving resonator.

6. The display device of claim 1, wherein the first power transmitter is located outside the first power receiver and the second power transmitter is located outside the second power receiver.

7. The display device of claim 1, wherein the first power receiver and the second power receiver are electrically connected in series to each other.

8. The display device of claim 1, wherein the wireless power receiver is configured to increase an output voltage of the second power receiver based on an output voltage of the first power receiver decreasing.

9. The display device of claim 1, wherein the first power transmitter and the second power transmitter generate magnetic fluxes in opposite directions.

10. The display device of claim 1, wherein the frame unit further comprises:
an image receiver, and
a short-range wireless transmitter configured to transmit an image signal received by the image receiver through short-range wireless communication, and
wherein the panel unit further comprises a short-range wireless receiver configured to receive the image signal through the short-range wireless communication from the short-range wireless transmitter based on the panel unit and the frame unit being spaced apart from each other.

11. The display device of claim 1, wherein the panel unit further comprises a wired power receiver configured to receive power by wire and supply the power to the display, and
wherein the display is further configured to receive the power from the wired power receiver at a higher priority than from the wireless power receiver.

12. The display device of claim 1, wherein the frame unit further comprises an auxiliary functional unit configured to operate independently from the panel unit,
wherein the wireless power transmitter is further configured to:
determine whether the panel unit is located at a distance in which wireless power transmission is possible, and
turn on or off the wireless power transmitter according to a result of the determining.

13. The display device of claim 1, wherein the panel unit further comprises screw holes according to a VESA mounting interface standard to fix the panel unit to a wall-mount, and
wherein the frame unit further comprises a coupling portion for fixing the frame unit to the wall-mount.

14. The display device of claim 1, wherein the panel unit further comprises screw holes according to a VESA mounting interface standard,
the transparent support comprises holes according to the VESA mounting interface standard, and
the display device further comprises an extension screw,
wherein the extension screw comprises:
a front header for coupling the panel unit and the transparent support together according to the VESA mounting interface standard, and
a rear header for fixing the transparent support to a wall-mount.

15. The display device of claim 1, wherein the frame unit is further configured to surround the panel unit.

16. An operating method of a display device comprising a panel unit, a frame unit configured to enclose the panel unit, and a transparent support to which the frame unit and the panel unit that are spaced apart from each other are fixed, the operating method comprising:
receiving, by the frame unit, power from the outside;
wirelessly transmitting, by a first power transmitter located on a first side of the frame unit and a second power transmitter located on a second side of the frame unit, a first power to a first power receiver located on an edge of a first side of the panel unit and a second power to a second power receiver located on an edge of a second side opposite to the first side of the panel unit;
wirelessly receiving, by the first power receiver and the second power receiver, the first power and the second power from the frame unit; and
displaying, by the panel unit, an image.

17. The operating method of claim 16, further comprising:

determining, by the frame unit, whether the panel unit is located at a distance in which wireless power transmission is possible; and turning on or off, by the frame unit, the wireless power transmission according to a result of the determining.

18. The operating method of claim 16, wherein the frame unit is further configured to surround the panel unit.

19. A non-transitory computer-readable recording medium having stored thereon a program for executing the operating method of claim 18.

* * * * *